United States Patent
Wang et al.

(10) Patent No.: US 10,311,426 B2
(45) Date of Patent: Jun. 4, 2019

(54) INTEGRATED COMMUNICATIONS NETWORK FOR TRANSACTIONS

(71) Applicant: Visa International Service Association, San Francisco, CA (US)

(72) Inventors: Quan Wang, Foster City, CA (US); Steven Countway, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 721 days.

(21) Appl. No.: 14/173,718

(22) Filed: Feb. 5, 2014

(65) Prior Publication Data

US 2014/0222599 A1  Aug. 7, 2014

Related U.S. Application Data

(60) Provisional application No. 61/818,824, filed on May 2, 2013, provisional application No. 61/818,812, filed
(Continued)

(51) Int. Cl.
*G06Q 20/32* (2012.01)
*G06Q 20/20* (2012.01)
*G06Q 20/02* (2012.01)

(52) U.S. Cl.
CPC ......... *G06Q 20/325* (2013.01); *G06Q 20/027* (2013.01); *G06Q 20/202* (2013.01); *G06Q 20/3224* (2013.01)

(58) Field of Classification Search
None
See application file for complete search history.

(56) References Cited

U.S. PATENT DOCUMENTS 5,771,275 A * 6/1998 Brunner ............. H04Q 11/0457
                                                    370/385
5,881,105 A * 3/1999 Balachandran ....... H04L 1/0068
                                                    370/498
(Continued)

FOREIGN PATENT DOCUMENTS

KR  10-2004-0052132 A   6/2004
KR  10-2004-0052133 A   6/2004
(Continued)

OTHER PUBLICATIONS

International Search Report and Written Opinion dated May 22, 2014 for PCT Patent Application No. PCT/US2014/014929, 12 pages.

*Primary Examiner* — Jeffrey M Rutkowski
*Assistant Examiner* — Andre G Tacdiran
(74) *Attorney, Agent, or Firm* — Kilpatrick Townsend & Stockton LLP

(57) ABSTRACT

An integrated communications network may be integrated with existing payment systems to provide for more efficient and secure payment related communications. The integrated communications network may use mobile network protocol encapsulation to provide more efficient, faster, and more robust payment related communications to a payment processor across a mobile network. The integrated communications network may implement a location-aware network communications system that may allow a payment processor to obtain additional information about a consumer using a location-aware header of a network communication.

18 Claims, 13 Drawing Sheets

Related U.S. Application Data on May 2, 2013, provisional application No. 61/761,185, filed on Feb. 5, 2013.

(56) References Cited

U.S. PATENT DOCUMENTS

| | | | | |
|---|---|---|---|---|
| 6,002,931 | A * | 12/1999 | Yamaguchi | H04W 8/06 379/201.01 |
| 6,094,578 | A * | 7/2000 | Purcell | H04W 88/16 455/426.1 |
| 6,587,684 | B1 * | 7/2003 | Hsu | H04M 1/72525 370/328 |
| 6,868,391 | B1 | 3/2005 | Hultgren | |
| 6,885,858 | B2 * | 4/2005 | Eder | G06Q 20/04 379/114.2 |
| 6,957,065 | B1 * | 10/2005 | Lindholm | H04W 8/04 370/355 |
| 7,920,529 | B1 * | 4/2011 | Mahler | H04W 8/04 370/338 |
| 8,467,807 | B1 | 6/2013 | Dalit et al. | |
| 8,478,639 | B2 | 7/2013 | Antonucci | |
| 8,559,968 | B2 | 10/2013 | Frank et al. | |
| 2001/0011256 | A1 * | 8/2001 | Hannula | G06Q 20/027 705/79 |
| 2002/0013163 | A1 * | 1/2002 | O'Prey | H04W 76/021 455/558 |
| 2002/0156729 | A1 * | 10/2002 | Nilson | G06Q 20/102 705/40 |
| 2002/0169883 | A1 * | 11/2002 | Bright | H04L 29/12188 709/230 |
| 2003/0153298 | A1 * | 8/2003 | Eder | G06Q 20/04 455/406 |
| 2003/0169881 | A1 | 9/2003 | Niedermeyer | |
| 2003/0182451 | A1 * | 9/2003 | Grass | H04L 29/06 709/246 |
| 2004/0062236 | A1 * | 4/2004 | Lee | H04L 12/56 370/356 |
| 2006/0217154 | A1 * | 9/2006 | Fauconnier | H04W 24/08 455/560 |
| 2006/0252424 | A1 * | 11/2006 | Ohno | H04M 15/00 455/432.1 |
| 2006/0268900 | A1 * | 11/2006 | Larsson | H04Q 3/0025 370/401 |
| 2007/0121821 | A1 * | 5/2007 | Su | H04M 3/42017 379/88.13 |
| 2007/0207802 | A1 * | 9/2007 | Palmer | H04Q 3/0025 455/428 |
| 2008/0022038 | A1 | 1/2008 | Akagawa et al. | |
| 2008/0167991 | A1 | 7/2008 | Carlson et al. | |
| 2008/0189210 | A1 | 8/2008 | Sawhney | |
| 2008/0201226 | A1 | 8/2008 | Carlson et al. | |
| 2008/0215752 | A1 * | 9/2008 | Che | H04L 29/12113 709/238 |
| 2008/0222038 | A1 | 9/2008 | Eden et al. | |
| 2010/0085948 | A1 * | 4/2010 | Yu | H04L 12/66 370/338 |
| 2010/0191602 | A1 | 7/2010 | Mikkelsen et al. | |
| 2010/0211491 | A1 | 8/2010 | Kagan et al. | |
| 2011/0276386 | A1 | 11/2011 | Deemer | |
| 2011/0299511 | A1 * | 12/2011 | Cook | H04W 84/105 370/338 |
| 2012/0006891 | A1 | 1/2012 | Zhou et al. | |
| 2012/0047003 | A1 | 2/2012 | Hammad et al. | |
| 2012/0095905 | A1 * | 4/2012 | Hodges | G06Q 20/027 705/39 |
| 2012/0179528 | A1 | 7/2012 | Ortiz et al. | |
| 2012/0203604 | A1 | 8/2012 | Baker et al. | |
| 2012/0226530 | A1 | 9/2012 | Gebb et al. | |
| 2013/0040639 | A1 * | 2/2013 | Witsaman | H04W 8/02 455/427 |
| 2013/0060679 | A1 * | 3/2013 | Oskolkov | G06Q 20/02 705/39 |
| 2013/0159086 | A1 | 6/2013 | Richard | |
| 2013/0204785 | A1 * | 8/2013 | Monk | G06Q 20/322 705/44 |
| 2013/0218769 | A1 * | 8/2013 | Pourfallah | G06Q 20/10 705/44 |
| 2014/0128034 | A1 * | 5/2014 | Xu | G06Q 20/102 455/411 |
| 2014/0194149 | A1 * | 7/2014 | Lavi | H04W 68/12 455/458 |
| 2014/0330721 | A1 | 11/2014 | Wang | |

FOREIGN PATENT DOCUMENTS

| | | |
|---|---|---|
| WO | 03/073337 A1 | 9/2003 |
| WO | 2010/089593 A1 | 8/2010 |
| WO | 2010/094014 A1 | 8/2010 |
| WO | 2011/049871 A1 | 4/2011 |
| WO | 2011/053808 A1 | 5/2011 |
| WO | 2012/051001 A2 | 4/2012 |
| WO | 2013/008055 A1 | 1/2013 |

* cited by examiner

400

A MOBILE SWITCHING CENTER ASSOCIATED WITH A FIRST MOBILE NETWORK RECEIVES A TRANSACTION REQUEST MESSAGE FROM A COMPUTING DEVICE COMMUNICATING WITH A SECOND MOBILE NETWORK, VIA A SWITCH
402

THE TRANSACTION REQUEST MESSAGE IS CONVERTED FROM A FIRST PROTOCOL TO A SECOND PROTOCOL USING A PROTOCOL CONVERSION MODULE
404

THE CONVERTED TRANSACTION REQUEST MESSAGE IS SENT TO A PAYMENT PROCESSING SERVER FOR PROCESSING
406

A TRANSACTION RESPONSE MESSAGE IS SENT FROM THE PAYMENT PROCESSING SERVER
408

THE TRANSACTION RESPONSE MESSAGE IS CONVERTED FROM THE SECOND PROTOCOL TO THE FIRST PROTOCOL
410

THE CONVERTED TRANSACTION RESPONSE MESSAGE IS SENT TO THE COMPUTING DEVICE VIA THE SWITCH
412

FIG. 4

INTEGRATED COMMUNICATIONS NETWORK FOR TRANSACTIONS

CROSS-REFERENCES TO RELATED APPLICATIONS

This application is a non-provisional application of and claims the benefit of priority of U.S. Provisional Application No. 61/818,824, titled, "COMMUNICATION NETWORK INFRASTRUCTURE," filed on May 2, 2013; U.S. Provisional Application No. 61/818,812, titled, "INTEGRATED COMMUNICATION NETWORK INFRASTRUCTURE," filed on May 2, 2013; and U.S. Provisional Application No. 61/761,185, titled, "INFRASTRUCTURE UTILIZING MOBILE CARRIER SYSTEM," filed on Feb. 5, 2013; all of which are herein incorporated by reference in their entirety for all purposes.

BACKGROUND

The widespread availability of mobile networks throughout various regions provides a readably available communications network for initiating and processing transactions throughout various rural, undeveloped, and even developed regions. For example, in some regions, there may not be sufficient payment processing infrastructure between consumers, merchants, acquirers, issuers, and payment processing networks to allow for established and traditional payment processing networks to operate. However, such regions typically have some mobile network infrastructure. Accordingly, existing mobile network infrastructure can be better leveraged to process payment and non-payment transactions.

Current implementations of using mobile networks for initiating and processing transactions are limited for a number of reasons. For example, in some solutions, a payment processor may work with mobile network operators to install hardware and/or software in each of a mobile network operator's base stations in order to use the mobile network to facilitate transactions for an established payment processing network. However, installing payment processing-specific network hardware at each base station of a mobile network requires significant infrastructure investment and maintenance. Since a payment processor may not necessary have direct access to the base stations, maintenance and monitoring of the installed hardware can be difficult, which raises reliability concerns. Furthermore, the hardware and/or software may be limited in bandwidth and processing speeds.

In other solutions, a mobile network operator and the payment processing network may coordinate with third party service providers (e.g., a third party IP conversion provider) in order to process transactions received on their mobile networks. Typically, third party service providers convert mobile communication messages to internet protocol messages on behalf of the payment processing networks and submit messages to the payment processing network to process transactions. After processing the transaction, the payment processing network may then return the message through the third party service provider, mobile network operator, issuer, and/or acquirer in order to complete the transaction. However, this process can be expensive, inefficient, slow, and complex as it requires a middle entity to manage and process transactions. These solutions may be also inefficient and costly as the payment processor may not have direct control of the third party equipment, and the data transmission may be limited by the size of the data packets configured to be processed by the communications network.

Therefore, there is a need for a mobile payment system to better leverage existing telecommunications infrastructure in a more efficient, reliable, and integrated manner to overcome the limitations of existing systems.

Further, the development and wide adoption of powerful mobile communications devices by consumers has provided mobile network operators, device manufacturers, and other mobile service providers with a large amount of consumer information that may not be directly available to transaction processors. Payment processing networks and other payment systems developed largely before the emergence and adoption of such powerful mobile communications devices used by consumers. Due to the large investment required to integrate mobile devices into existing payment transaction processing flows, much of the additional information that mobile devices can provide have not been integrated into payment systems and those payment systems that have integrated such information, have not done so at the network communications protocol level.

Therefore, there is a need for an integrated communications network that is capable of integrating existing payment systems with the unique information available from the ubiquitous use of mobile devices by consumers.

Embodiments of the invention address the above problems, and other problems, individually and collectively.

SUMMARY

Embodiments of the invention are directed to a method comprising receiving, by a mobile switching center associated with a first mobile network, a transaction request message from a computing device communicating with a second mobile network. The transaction request message may be received via a switch configured to connect a plurality of mobile networks. In such embodiments, the second mobile network may be remote from the first mobile network and local to the computing device. The method further comprises converting the transaction request message from a first protocol to a second protocol by a protocol conversion module. The converted transaction request message may be sent to a payment processing server, and the payment processing server may process a transaction associated with the converted transaction request message. The method further comprises receiving a transaction response message from the payment processing server, converting the transaction response message from the second protocol to the first protocol, and sending the converted transaction response message to the computing device via the switch.

Another embodiment of the invention is directed to a computer comprising a processor, and a computer readable medium coupled to the processor, the computer readable medium comprising code, executable by the processor for implementing a method. The method comprises receiving, by a mobile switching center associated with a first mobile network, a transaction request message from a computing device communicating with a second mobile network. The transaction request message may be received via a switch configured to connect a plurality of mobile networks. In such embodiments, the second mobile network may be remote from the first mobile network and local to the computing device. The method further comprises converting the transaction request message from a first protocol to a second protocol by a protocol conversion module. The converted transaction request message may be sent to a payment processing server, and the payment processing server may process a transaction associated with the converted transaction request message. The method further comprises receiving a transaction response message from the payment processing server, converting the transaction response message from the second protocol to the first protocol, and sending the converted transaction response message to the computing device via the switch.

Another embodiment of the invention is directed to a method comprising receiving a network protocol packet including a network protocol header and a transaction payload. The network protocol header may include a location-aware header portion, including location-aware data retrieved by a location terminal in proximity to a mobile device. The method further comprises parsing the location-aware header portion from the network protocol packet and identifying the location-aware data within the location-aware header portion according to a location-aware network protocol. The method further comprises retrieving a consumer-targeted message from a database based on the location-aware data in the location-aware header portion. The method further comprises generating a response message including the consumer-targeted message and sending the response message including the consumer-targeted message to the mobile device.

Another embodiment of the invention is directed to a method comprising receiving a network protocol packet including a network protocol header and a transaction payload. The network protocol header may include a location-aware header portion, including location-aware data retrieved by a location terminal in proximity to a mobile device. The transaction payload may include transaction data generated by a point of sale device for a transaction. The method further comprises parsing the location-aware header portion from the network protocol packet and identifying location-aware data within the location-aware header portion according to a location-aware network protocol. The method further comprises performing an authorization process for the transaction using the transaction data. The transaction is validated using the data in the location-aware header portion. A validation response message is generated for the transaction based on the validation, and sent to the mobile device.

Another embodiment of the invention is directed to a system comprising a plurality of location terminals configured to retrieve data from a mobile device in proximity to one of the plurality of location terminals, and store the retrieved data in a location-aware header portion of a network protocol header of a network protocol packet. The system further includes a location proxy device configured to receive the network protocol packet and store transaction data generated by a point of sale device into a transaction payload of the network protocol packet. The system further comprises a server computer configured to receive the network protocol packet from the location proxy device, perform an authorization process for the transaction using the transaction data, and process the retrieved data from the location-aware header portion of the network protocol packet. The server computer is further configured to validate the transaction using the retrieved data, generate a validation response message for the transaction based on the validation, and send the validation response message to the mobile device.

These and other embodiments of the invention are described in further detail below with reference to the Figures and the Detailed Description.

BRIEF DESCRIPTION OF THE DRAWINGS

FIG. 4 is a flowchart describing a method of processing a transaction using a payment processing network mobile network according to an embodiment of the present invention.

DETAILED DESCRIPTION

Figure 1:
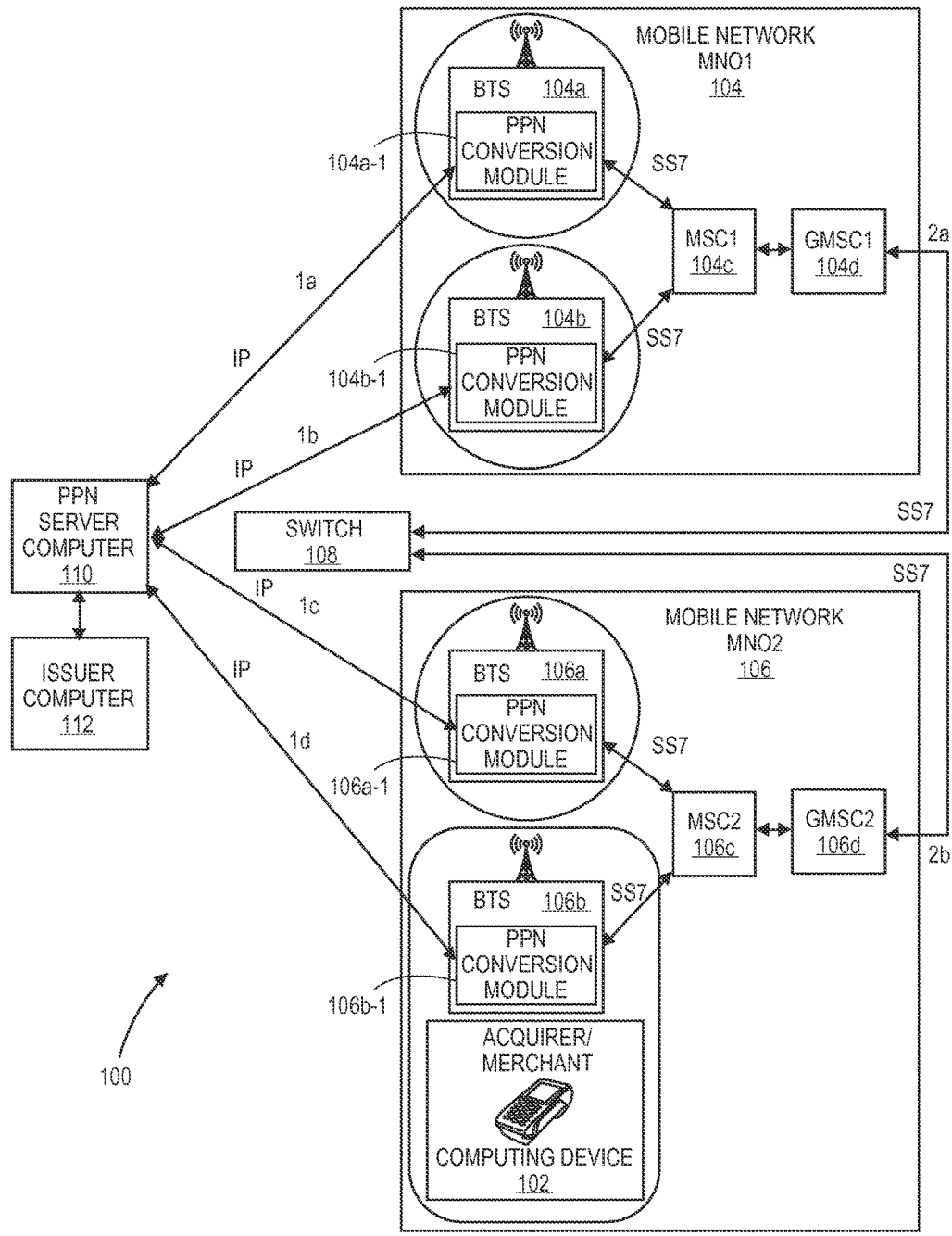
FIG. 1 shows an existing system for transferring data received over a mobile network from a computing device to a payment processing network server computer using local conversion modules at mobile network base stations.

Embodiments of the invention are directed at methods, systems, and apparatuses for providing an integrated communications network that may be integrated with existing payment systems to provide for faster, more efficient, smarter (i.e., more secure), and more flexible payment related communications systems. The integrated communications network may include at least two distinct but related concepts that allow the integrated communications system to implement higher throughput, more secure, and more flexible payment systems. First, some embodiments of the integrated communications network may use mobile network protocol encapsulation to use existing telecommunications infrastructure to provide faster, more efficient, and more robust payment communications across mobile networks. Second, some embodiments of the integrated communications system may include location-aware capabilities that may allow a payment processor to obtain additional information about a consumer that existing payment systems may not have direct access to, and pass the additional information using a location-aware header of a network communication to provide additional consumer authentication, consumer-targeted information, or any other relevant applications using the additional data.

First, as described above, some embodiments of the integrated communications network may use mobile network protocol encapsulation to provide more efficient, faster, and more robust payment related communications to a payment processor across a mobile network. For example, a payment processor may become operator of mobile network infrastructure in order to gain access to out-of-band signaling channel capabilities associated with mobile networks. The out-of-band signaling channel (e.g., an out-of-band control signaling channel) may be out-of-band from the voice data channel associated with mobile networks, and may be traditionally used to control the setup and break down of end-to-end voice telecommunication messages. In embodiments of the present invention, the out-of-band signaling channel may be used to pass transaction data for more efficient, higher throughput, and more reliable payment solutions using mobile communication networks.

In some embodiments of the present invention, the payment processor may issue subscriber identifiers and/or secure modules with such subscriber identifiers (e.g., device identifiers stored on SIM cards) to computing devices involved in payment transactions to allow the computing devices to access mobile communication networks. The computing devices may then use their subscriber identifiers for authentication to the mobile networks. In some embodiments, the local mobile network infrastructure may be able to identify the home mobile switching center associated with the payment processor and pass data all the way to the mobile switching center associated with the computing device subscriber identifier while staying in the mobile or telephony network domain. For example, even when the home mobile switching center is located away from the local mobile network of the computing device, the data can be passed to the home mobile switching center of the computing device through multiple mobile and/or telephony networks using mobile roaming technology.

The computing devices may be configured to encapsulate payment related communications originating in a communications protocol (e.g., internet protocol communications, short message service (SMS), unstructured supplementary service data (USSD), ISO, Society for Worldwide Interbank Financial Telecommunication messages (SWIFT), enhanced messaging service (EMS), multimedia messaging service (MMS), extensible markup language (XML)) into the mobile network protocol (e.g., SS7 communications or other out-of-band signaling messages), and may pass the payment related communications encapsulated in the mobile network protocol to the payment processing network using existing mobile network roaming infrastructure. By encapsulating the payment related communications into the mobile network protocol, the payment related communications may be passed across multiple mobile networks using existing roaming communications infrastructure. Once received at a mobile switching station associated with the payment processing network, the encapsulated communications can be decapsulated, decoded, or otherwise converted into the associated payment communication protocol for processing. Accordingly, the mobile switching center associated with the payment processor may have a central protocol conversion module that may be configured to perform mobile network protocol (e.g., SS7, etc.) to non-mobile communications protocol (e.g., Internet Protocol (IP), etc.) conversion, and pass the payment related information in the received communications to the payment processor for processing. Accordingly, payment communications may be passed more efficiently, robustly, and in higher throughput to a payment processor using end-to-end mobile network communications via mobile network infrastructure across multiple mobile networks. Additionally, the end-to-end mobile network communications do not require local protocol conversion modules integrated into mobile base stations in order to pass communications to and from payment processing systems.

Second, embodiments of the integrated communications network may implement a location-aware network communications system that may allow a payment processor to obtain additional information about a consumer using a location-aware header of a network communication. The information passed in the location-aware header may allow the payment processor the ability to provide more effective authentication of a consumer during a transaction and provide additional fraud analysis, consumer-targeted information (e.g., advertisements, coupons, alerts, etc.), and other applications relevant to a payment process. For example, a location-aware network header may include a merchant identifier (e.g., a unique identifier associated with a merchant, service provider, government entity, or any other registered party), a location identifier (e.g., a particular merchant's store location, a location within a merchant's store, etc.), a mobile device identifier (e.g., a hardware identifier for the mobile device, a phone number, a device manufacturer serial number, etc.), a consumer identifier (e.g., a subscriber identifier, a mobile wallet identifier, a payment account user name, a phone number, etc.), and/or a transaction type indicator (e.g., tracking, payment transaction, etc.), or any combination thereof. The location-aware network header may allow a payment processor to obtain direct access to additional information about the consumer and/or merchant in order to better authenticate consumers and transactions as well as better predict consumer behavior and target consumers for advertising and management services. In some embodiments, this additional information can be made available to a payment processor without requiring the consumer to conduct a transaction.

Furthermore, the location-aware header may be integrated with existing payment systems by incorporating the location-aware information into a network communication protocol header instead of in a transaction payload. For example, the location-aware header may be transmitted in the network protocol header along with an existing payment message (e.g., ISO 8583 standard payment authorization request message) as the payload to a payment processor that may parse the information in the location-aware header message before processing the existing payment message in the payload using existing transaction processing systems. The payment processor may then use the additional information provided in the location-aware header to further authenticate and validate the transaction. Accordingly, embodiments may be incorporated into existing payment systems at the network communication protocol level without requiring different payment standards and authorization systems.

Additionally, in some embodiments, the location-aware header information may be used with other types of transaction payload. For example, the transaction payload may include mobile communications, broadcast communications (e.g., television, radio, satellite, etc.), or other protocol specific device-to-device communications. In some embodiments, the integrated communication network infrastructure may capture transactions that are initiated through different types of networks such as payment processing networks (e.g., via point of sale devices or Europay®, MasterCard® and Visa® (EMV) devices), mobile networks (e.g., via mobile or portable computing devices), internet (e.g., via computing devices such as desktops, laptops, etc.), as well as through television networks, or any types of communication infrastructure.

Embodiments of the present invention may consolidate various transaction standards into a single enhanced standard that can process transactions originating through any of these channels/networks, rather than using different individual processing standards required for different networks. This enhanced standard may use the location-aware header to provide enhanced data processing and analysis, including increased consumer location tracking capabilities, increased information about consumer behavior, and enhanced consumer authentication and fraud detection. Through these improvements, the integrated platform provides merchants with more value by improving the volume of transactions that a merchant may process, thus leading to potentially more revenue for a merchant. The location-aware header also may improve the amount of transactions that the network may process by expanding the infrastructure to incorporate different payment protocols and channels (i.e., internet, proprietary or existing payment processing protocols, mobile communication networks protocols (e.g., SS7), television protocols, etc.).

A detailed explanation of each of the above described integrated communication network capabilities are described separately below. However, note that both network capabilities may be incorporated into a single integrated communication system that allows a payment processor to receive location-aware transaction information using the location-aware network headers and distribute alerts, incentives, and any other relevant information across mobile network infrastructure to mobile devices (and other computing devices) using mobile network protocol encapsulation.

I. Mobile Network Protocol Encapsulation

Embodiments of the present invention are directed to systems, apparatuses, and methods of implementing an out-of-band signaling channel (e.g., out-of-band control signaling channel such as SS7 communications protocol, etc.) payment network architecture using a centralized payment processing network incorporating both mobile network operator functionality and payment processing capabilities. For example, in some embodiments of the present invention, a payment processing network (e.g., Visa™) may implement a protocol conversion module that is capable of converting messages received over an out-of-band signalling channel (e.g., an SS7 protocol) to be transmitted over the Internet via an internet protocol (IP).

In some embodiments of the prevent invention, the conversion may be performed by a stream control transmission protocol (SCTP). The stream control transmission protocol may be configured to identify an internet protocol message encapsulated within an SS7 protocol message, and to decapsulate the message received using an SS7 protocol back into an internet protocol message. The message may be sent as part of processing a transaction or to convey a data message to the payment processing network or to another user using an out-of-band signaling channel associated with a mobile network. Accordingly, the protocol conversion module may facilitate the integration of a mobile network and an internet protocol based payment processing network into a single entity that may be able to direct, convert, process, and communicate across multiple networks using both mobile network protocols (e.g., SS7 out-of-band signaling channel communications protocols) and IP protocols.

For example, in some regions, there may not be sufficient payment processing infrastructure between consumers, merchants, issuers, and payment processing networks to allow for established and traditional payment processing networks to operate. For example, merchants in some rural areas may not have network connectivity to process card transactions. However, such regions typically have some mobile network infrastructure. Accordingly, transactions may be processed using mobile networks by implementing SS7 communications protocols to pass transaction information across the mobile network infrastructure to a central mobile network associated with a payment processing network for processing. SS7 communications protocol stands for Signaling System No. 7 and is a standard followed by mobile network operators around the world.

According to embodiments of the present invention, a payment processing network (e.g., Visa®) may incorporate the functionality of a mobile network operator into the central payment processing systems in order to provide an end-to-end transaction processing system that may operate across both an IP protocol as well as mobile network protocols, such as SS7. Accordingly, a payment processing network may provide transaction processing and routing services across multiple networks and throughout various regions domestically or around the world from a central location without requiring payment processing network infrastructure to be placed on each base station, as depicted in FIG. 1.

For example, in some embodiments of the present invention, a payment processing network (e.g., a payment processor) may obtain cellular spectrum in a geographical region and become a registered mobile network operator. Because the payment processing network is registered as a mobile network operator (i.e., telecommunications provider) and may provide services to cellular network subscribers, the payment processing network may gain access to SS7 signaling infrastructure.

Once the payment processing network has access to the SS7 infrastructure, the payment processing network may use the signaling infrastructure to encapsulate, transmit, receive, convert, and/or process transactions (and other data messages) from around the world at a central location via mobile networks. In some embodiments, the payment processing network may provide a subscriber identifier for a computing device (e.g., a subscriber identifier stored in a SIM card, secure memory element, or other types of secure module, etc.), and may use the subscriber identifier to send and receive transaction communications, notifications, alerts, coupons, rewards, etc. over a mobile network communications infrastructure. The payment processing network may use existing mobile network roaming infrastructure to identify and communicate with devices communicating over multiple mobile networks anywhere in the world in a more efficient, effective, and faster manner.

In addition, using embodiments of the present invention, the payment processing network can avoid using a third party IP protocol conversion service and instead convert all of the transaction messages using a protocol conversion module at the payment processing network mobile network. Therefore, instead of the payment processing network having to install hardware or software upgrades into mobile network operators' local base stations throughout the world, the payment processing network may have a roaming agreement with the mobile network operators to route end-to-end transactions between users, merchants, and any other configured devices to the payment processing network using the roaming capabilities of the mobile network infrastructure.

The transaction messages received in the mobile network protocol format at the payment processing network can then be converted to an internet protocol to allow components of the payment processing network to process the transaction via internet protocol. After processing, the payment processing network may then reverse the transaction flow and return a transaction authorization or transaction completion message back to the consumer, a merchant associated with the transaction, a mobile network operator associated with the consumer, etc. The return message may be encapsulated within the mobile network protocol (e.g., SS7) prior to being sent back through the mobile network.

A. Definitions

Prior to discussing embodiments of the invention, descriptions of some terms may be helpful in understanding embodiments of the invention.

The term "mobile network" may refer to any type of wireless network that allows for communication between devices. Each mobile network may be served by at least one fixed-location transceiver (e.g., a base station) that covers a particular geographic region. A mobile network may include a plurality of base stations, allowing communications between mobile devices and computing devices moving through the geographic region served by the plurality of base stations. Communications between base stations may be accomplished by sending voice or data information through a mobile switching center that is communicatively coupled with the base stations. Mobile networks allow mobile devices and computing devices to be connected to a switch (e.g., a public switched telephone network (PSTN)) in order to provide telephone and other network services with other mobile devices and computing devices located on other mobile networks. Each mobile network may be owned and operated by a different mobile network operator (e.g., telecommunications service provider) that provides services (e.g. voice and data communications) for users and devices that are subscribed to the mobile network operator's mobile network. A computing device that is subscribed to the mobile network may have a unique subscriber identifier provisioned on a secure module (e.g., SIM card) associated with the computing device. For example, the unique subscriber identifier can be provisioned on a hardware component of the computing device (e.g., a SIM card, a secure module, etc.).

The term "base station" may refer to a device that may facilitate communications across mobile networks. The base station is typically installed at a fixed location and may contain: equipment for transmitting and receiving voice and/or data signals (e.g., transceivers), antennas, and equipment for encrypting and decrypting communications with a base station controller (BSC). Base stations may be used by mobile networks to facilitate communications between mobile devices. The base station may also be referred to as a base transceiver station (BTS). Base station controllers may be configured to control one or more BTS, and provide the functionality of managing the network, handover management and call setup.

The term "mobile switching center" may refer to a device configured for routing data and signals. The mobile switching center (MSC) may be responsible for routing voice calls, short message service (SMS) messages, and other data through a mobile network. The mobile switching center may also be configured to set-up and release end-to-end connections. The mobile switching center may also be configured to handle handovers between base stations. For example, when a mobile device approaches the edge of a region covered by a first base station, the mobile switching center may determine an adjacent base station for handing over the management and services for the mobile device. A mobile network may include one or more mobile switching centers, typically based on the size of the mobile network.

The mobile switching center may also be configured to determine in which mobile switching center the destination device or system is currently located. Communications between computing device (e.g., mobile phones) are typically routed to a switch (e.g., a global switch or public switched telephone network (PSTN)) through the mobile switching center. In some embodiments, some of the functionality of the mobile switching center may be implemented by a separate gateway mobile switching center. In such embodiments, the gateway mobile switching center (GMSC) may be coupled or linked to the mobile switching center.

The term "switch" may refer to a device for receiving and directing communications data. For example, the switch may receive data and voice communications from a source (e.g., a first mobile network) and direct the communications to a destination (e.g., a second mobile network). In embodiments of the present invention, the switch may also direct data communications sent by a mobile network to a payment processing network mobile network (e.g., a mobile network operated by a payment processor network). An example of a switch is a public switched telephone network, which is an international telephone system that carries data between networks. The switch can be configured to pass both in-band communications data and out-of-band signaling communications. In embodiments of the present invention, the switch may send and receive encapsulated transaction messages using the out-of-band signaling channel.

The term "communicatively couple" may refer to an association between devices that allows data to be sent between the devices. For example, communicatively couple may refer to a connection between two mobile networks that allows data and voice communications to be transmitted between the two mobile networks. In embodiments of the present invention, the connection between the two or more mobile networks that communicatively couples the two or more mobile networks may be through a switch (e.g., a public switched telephone network).

The term "remote" may refer to an association between two devices. In embodiments of the present invention, remote may refer to when a mobile network is not directly communicating with a computing device. For example, when the computing device that is subscribed to a first mobile network (e.g., AT&T™) is communicating with a base station in a second mobile network (e.g., Verizon™), the computing device may be considered remote to a first mobile network.

The term "local" may refer to an association between two devices. In embodiments of the present invention, local may refer to a mobile network that a computing device is presently or currently communicating with. For example, when the computing device is communicating directly with a base station in a second mobile network, the computing device may be considered local to that base station and local to that second mobile network.

The term "protocol" may refer to a set of standards for formatting a data message or the transmission of message. In embodiments of the present invention, protocol may refer to a communications protocol that may be used to facilitate communications between two or more mobile networks, systems, or devices. Each communications protocol may define rules for the data exchange between computing devices. A protocol may be implemented as hardware, software, or both. In order for different systems and devices to be able to understand data sent between two devices, communications protocols may be uniform between the parties involved, or the systems may be configured to convert, encapsulate/decapsulate, and/or encode/decode different communications protocols. In embodiments of the present invention, a data message may be sent from a first mobile network in a first protocol, and the second mobile network may be required to convert, decapsulate, or decode the data message into a second protocol to be able to process the data message.

The term "converting" may refer to a process of altering data communications. For example, in embodiments of the present invention, converting may refer to the process of encapsulating a data message that is sent in a first protocol within a second protocol. For example, a transaction request message may be generated by a computing device in an internet protocol. The transaction request message in the internet protocol may be encapsulated within a mobile network communications protocol (e.g., SS7 communications protocol), which may allow the transaction request message to be transmitted or sent over traditional mobile network infrastructure (e.g., from a base station and to a switch via a mobile switching center). Converting may further refer to the process of decapsulating (or decoding) the encapsulated data message to extract the data message in the first protocol from the second protocol. For example, the protocol conversion module may receive the transaction request message from the computing device via the switch, and decapsulate the transaction request message from the mobile network protocol (e.g., SS7 communications protocol).

The term "payment processing network mobile switching center" may refer to a mobile switching center configured to provide transaction related services. In such embodiments, the payment processing network may function as a mobile network operator. In some embodiments, the payment processing network mobile switching center may combine the functions and services provided by a traditional mobile network and a payment processing network. In other embodiments, the payment processing network mobile network may be configured to provide transaction-related services and may not provide traditional telecommunications services (e.g., voice calls between mobile device users).

The term "home location register" may refer to a database storing user data and device data for a mobile network. The data stored by the home location register (HLR) may include a subscriber identifier (e.g., an international mobile subscriber identity (IMSI)) and a connection identifier associated with the subscriber identifier (e.g., a mobile station international subscriber directory number (MSISDN)) for each mobile device or computing device subscribed to the mobile network. The subscriber identifier (e.g., IMSI) is used to uniquely identify each Subscriber Identity Module (SIM) configured for use on the mobile network. The subscriber identifier (e.g., IMSI) may be used as the primary key for each home location register record. The connection identifier (e.g., a MSISDN) may include a telephone number for each subscriber device. The home location register (HLR) record for each subscriber device may also include the current location of the device within either the mobile network to which the device is subscribed to or a different mobile network. The HLR record for each subscriber device may be updated when the SIM associated with the device moves into another area covered by a different home location register.

The term "visitor location register" may refer to a database storing user data and device data for a mobile network. The visitor location register (VLR) may be a database of both the subscriber and non-subscriber computing devices (e.g., mobile devices) that have roamed into the jurisdiction or coverage area of a mobile switching center (MSC). Typically, the visitor location register only contains the mobile devices that are currently located in the area covered by the particular mobile switching center the visitor location register is associated with. Once a mobile device moves out of the area covered by the particular mobile switching center (or is inactive for a period of time), the visitor location register record for the mobile device may be deleted. The visitor location register may receive the user data and device data for a non-subscriber's computing device from the home location register (HLR) of the mobile network associated with the non-subscriber. One function of the visitor location register is minimizing the number of queries that the mobile switching center must make to the home location register, which holds permanent data regarding the mobile network's subscribers.

The term "internet protocol network" may refer to a network configured to provide communications between computing devices, including mobile devices. Each computing device within an internet protocol (IP) network may use internet protocol for their communications protocol. Computing devices connected through an IP network each have unique internet protocol addresses that are used to uniquely identify the computing device within the IP network. Data may be sent across the IP network from a source computing device to a destination computing device in data packets containing control information (e.g., IP addresses of destination computing device and source computing device) and data (e.g., message contents).

The term "protocol conversion module" may refer to a module that is configured to convert a data message from a first protocol to a second protocol. In some embodiments, different mobile networks may utilize different protocols for sending and receiving data. In order to provide interoperability (e.g., communications) between mobile networks utilizing different protocols, the protocol conversion module may be required to convert the protocol used by a source computing device to the protocol used by a destination computing device. The conversion may be accomplished by encapsulating the data signal in a first protocol into a second data signal in a second protocol. For example, the protocol conversion module may encapsulate a data message sent in an internet protocol within an SS7 protocol message. This may facilitate the transaction of the data message sent through a mobile network system. The protocol conversion module may convert the data message from an SS7 protocol using a stream control transmission protocol to encapsulate the transaction request message within an internet protocol message. In some embodiments, the protocol conversion module may not be located in a base station of the mobile network, and may be a component in a payment processing network mobile switching center. In other embodiments, the protocol conversion module may be a separate component within a payment processing network mobile network and be linked to the payment processing network mobile switching center.

The term "stream control transmission protocol" may refer to a protocol used to encapsulate a data message into a transmission protocol. In some embodiments of the present invention, the stream control transmission protocol may be used by the protocol conversion module to encapsulate an internet protocol message within an SS7 protocol signal so that the internet protocol message may be passed over one or more mobile networks, and be decapsulated and processed at a payment processing network. In other embodiments, the stream control transmission protocol may be used to encapsulate and decapsulate other message protocols including SMS, USSD, and any other designated communication protocols that are understood between two computing devices.

The term "computing device" may refer to device that is configured to send and receive data messages. For example, the computing devices may send and receive data messages to conduct a transaction. The computing device may be capable of conducting communications over a mobile network. In some embodiments, the computing device may be a subscriber to a mobile network. In such embodiments, the computing device may include a subscriber identity module (SIM) or other secure module or element that may be provided by the mobile network or by a payment processing network.

A computing device may be in any suitable form. For example, suitable computing devices can be hand-held and compact so that it can fit into a user's pocket (e.g., pocket-sized). The computing device can include a processor and memory, input devices, and output devices, operatively coupled to the processor. Specific examples of computing devices include cellular or mobile phones, computer systems configured to communicate with a mobile network, transaction system access devices, tablet computers, personal digital assistants (PDAs), pagers, portable computers, smart cards, and other similar devices. Computing devices may also be referred to as mobile devices, user devices, mobile stations or subscriber devices. Computing devices may also be referred to as merchant computers, point of sale (POS) devices, acquirer computers and/or issuer computers.

In some embodiments, the computing device may comprise a SIM card or other secure module or hardware device that contains a device identifier (e.g., IMEI), subscriber identifier (e.g., IMSI), and is associated with a phone number (e.g., MSISDN) provided by a mobile network operator. Depending on the type of mobile network being operated (e.g., CDMA or GSM), the computing device may regularly (e.g., periodically at a very high rate) communicate the relevant identifier information (e.g., IMEI, IMSI, MSISDN) to base stations that track the users connecting to their tower at any given time in order to allow communication with any computing device.

The term "communicating" may refer to the conveyance of data or information between devices. For example, communicating may refer to a computing device or mobile device actively exchanging data and information with a base station in a mobile network. Communicating may also generally refer to the computing device being located within the coverage area of a particular base station of the mobile network.

The term "mobile station roaming number" may refer to an identifier used to route communications between mobile networks. For example, a mobile station roaming number (MSRN) may be a telephone number used to route telephone calls in a mobile network from a gateway mobile switching center (GMSC) to the target mobile switching center (MSC) of a second mobile network where a mobile station (e.g., computing device or mobile device) is located. The mobile station roaming number is needed by the home network to forward incoming communications directed to the computing device or mobile device to the second mobile network the computing device or mobile device is currently visiting. A visitor location register (VLR) may generate the mobile station roaming number on request from the mobile switching center, and the mobile station roaming number may also be stored in the home location register (HLR). The mobile station roaming number may contain the current visitor country code, the visitor national destination code, the identification of the current mobile switching center together with the subscriber number. The mobile station roaming number may also be referred to as a "mobile subscriber roaming number."

The term "subscriber identifier" may refer to data that may be used to uniquely identify a subscriber. The subscriber identifier may be a numeric or alphanumeric value. The subscriber identifier may include two parts. The first part may be comprised of five or six digits identifying a network operator in a specific country with whom the subscriber holds an account. The second part is allocated by the mobile network operator to uniquely identify the subscriber. Subscriber identity module (SIM) cards, storing the subscriber identifier, can be installed and transferred between different mobile devices. The SIM information may also be stored on a device's general storage memory or may be secured within a SIM card emulator on the general memory.

In some embodiments, the subscriber identifier may also be referred to as an international mobile subscriber identifier (IMSI). The IMSI may be used to acquire the details of the mobile device in the home location register (HLR) or the visitor location register (VLR). The international mobile subscriber identifier (IMSI) may be composed of two parts, a mobile network operator identifier and a subscriber identifier. The mobile network operator identifier may be used to identify the mobile network operator in a specific country with whom the subscriber holds an account. The subscriber identifier may be used by the mobile network operator to uniquely identify the subscriber.

The term "secure module" may refer to a hardware element that securely stores data. The secure module may store any data for a mobile device, including, for example, a device identifier, a consumer identifier, and a consumer credential. The secure module may be associated with a unique identifier established by an entity that issued the secure module. Such entities may include a mobile device manufacturer, a mobile network operator, a payment processing network, or an issuer (e.g., bank). The secure module may be embedded within a mobile device. An example of a secure module is a subscriber identifier module (SIM) card. SIM cards can provide identification, authentication, data storage and application processing. SIM cards can also be configured to allow a mobile device to send and receive communications. SIM cards can store network-specific information that can be used to authenticate and identify subscribers on a network in order to allow a mobile device access to the network.

The term "message" may refer to any data or information that may be transported from one entity to another (e.g., one mobile/computing device to another mobile/computing device). Further, a message may include a single signal or data packet or a combination of multiple transporting signals. For example, a message may include an analog electrical signal or digital signal that constitutes binary information that may be interpreted as communicating information. Additionally, a message may comprise any number of pieces of information including both private and/or public information. Messages may be communicated internally between devices within a secure organization or externally between a device within a secure organization or network to a device outside of a secure organization, area, or communication network. Additionally, whether information contained within a message is considered public or private may be dependent on who the secure organization or area originating the message is, who the message is being sent to (e.g., recipient computer or requesting computer), or in any other suitable manner. Additionally, messages may be modified, altered, or otherwise changed to comprise encrypted or anonymized information.

The term "account identifier" may refer to any information that may be used to identify an account. The account identifier can be represented as a series of alphanumeric characters, one or more graphics, a token, a bar code, a QR code, or any other information that may be associated with an account. For example, the account identifier may be an account number associated with a financial account, or may be a special identifier generated randomly or according to a predetermined algorithm, code, or shared secret. The account identifier for a financial account may be generated by an issuer associated with the financial account, and distributed to the payment processing network. In some embodiments, the account identifier may be stored in a memory component of a user device. The account identifier may also be embedded in a payment device, such as in a magnetic stripe portion of a payment device in the form of a payment card.

The term "transaction" may refer to a transfer of value between two users (e.g. individuals or entities). A transaction may involve the exchange of monetary funds, or the exchange of goods or services for monetary funds between two individuals or entities. A typical transaction, as contemplated by embodiments of the claimed invention, involves the transfer of funds from a first account associated with a first payment device to a second account associated with a second payment device. In other embodiments, a transaction may involve an individual or entity purchasing goods or services from a merchant or other entity in exchange for monetary funds. In other embodiments, the transaction may be a non-financial-related request, such as exchanging of data or information between two entities.

The term "transaction request message" may include a message sent from one entity to another entity requesting that a transaction be authorized. In some embodiments, the transaction request message may be an authorization request message from a merchant or acquirer computer requesting that an issuer authorize a financial transaction. In other embodiments, the transaction request message may be a request for a non-financial transaction, such as requesting data, coupons, etc. The transaction request message may be sent from the computing device through the mobile network to one or more other mobile networks, including a payment processing network mobile network.

The term "transaction response message" may include a message sent from one entity to another entity responding to a transaction request message. In some embodiments, the transaction response message may be an authorization response message from an issuer to a merchant or acquirer computer authorizing or declining a financial transaction. In other embodiments, the transaction response message may be a response for a non-financial transaction, such as providing data, coupons, etc. The transaction response message may be sent from the issuer computer through the mobile network to one or more other mobile networks, and to a computing device that made the request.

The term "user" may refer to an individual or entity. The user may be a consumer or business who is associated with a financial account and whose financial account can be used to conduct financial transactions using a user device associated with the financial account.

The term "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "payment processing network" may refer to a network that includes or operates at least one server computer used for payment processing. In some embodiments, the server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers. In some embodiments, the payment processing network may operate multiple server computers. In such embodiments, each server computer may be configured to process transaction for a given region or handles transactions of a specific type based on transaction data. The server computer may be referred to as a "payment processing server."

The payment processing network may include data processing subsystems, networks, and operations used to support and deliver authorization services, exception file services, and clearing and settlement services. An exemplary payment processing network may include VisaNet™. Networks that include VisaNet™ are able to process credit card transactions, debit card transactions, and other types of commercial transactions. VisaNet™, in particular, includes an integrated payments system (Integrated Payments system) which processes authorization requests and a Base II system, which performs clearing and settlement services. The payment processing network may use any suitable wired or wireless network, including the Internet.

The payment processing network may process transaction request messages and determine the appropriate destination (e.g., issuer computer) for the transaction request messages. The payment processing network may also handle and/or facilitate the clearing and settlement of transactions.

B. Systems

FIG. 1 shows an existing system 100 for transferring data from a computing device 102 (e.g., mobile device, point of sale device, access device, merchant computer, acquirer computer) communicating with a first mobile communication network to a payment processing network (PPN) server computer 110. The system 100 includes a computing device 102, a first mobile network MNO1 104, a second mobile network MNO2 106, a switch 108, a payment processing network server computer 110, and an issuer computer.

Mobile network MNO1 104, as depicted in FIG. 1, includes a plurality of base stations ("BTS") 104a and 104b, each including a PPN conversion module 104a-1 and 104b-1, respectively. The PPN conversion modules (104a-1 and 104b-1) may include hardware, software, and other communications infrastructure installed at base stations of mobile networks to facilitate the conversion and transmission of data messages from the mobile networks MNO1 104 and MNO2 106 to the PPN server computer 110. Each PPN conversion module (104a-1 and 104b-1) may convert the data messages from a first communication protocol (e.g., SS7 protocol) to a second communication protocol (e.g., internet protocol) to communicate with the PPN server computer 110. It should be understood that the PPN conversion modules (104a-1 and 104b-1) performs the conversion locally within the local mobile network of a computing device, and that once a data message has been converted, for example, from SS7 protocol to internet protocol, the data message can no longer be roamed to a remote location using mobile networks, but is instead transmitted using internet protocol network equipment.

Mobile network MNO1 104 may also include a mobile switching center ("MSC1") 104c and a gateway mobile switching center ("GMSC1") 104d. The base stations 104a and 104b may communicate with the MSC1 104c for the performance of mobile network functions, including handovers of computing devices between base stations, and transmitting messages received by the base stations 104a and 104b. As shown in FIG. 1, mobile network MNO2 106 may have an identical structure and components as mobile network MNO1 104. In some embodiments, mobile network MNO1 104 and mobile network MNO2 106 may be owned and operated by different mobile network operators (e.g., telecommunications service providers).

The switch 108 may be a device that is configured to communicatively couple a plurality of mobile networks. This may allow computing devices located throughout a small region or throughout the world to communicate with each other. In some embodiments, switch 108 may be a public switched telephone network (PSTN) switch, and may be part of a telephony network that aggregates interconnected circuit-switching telephone networks. The switch 108 allows mobile and telephone devices to connect to one another and allows data from one mobile network to be sent to a second mobile network. Each mobile network (e.g., MNO1 104 and MNO2 106) is connected to the switch 108 to facilitate telephone communications between mobile networks. In some embodiments, the switch 108 utilizes the Signaling System No. 7 ("SS7") signaling protocol for the exchange of control information associated with the establishing and release of a telephone communication between mobile networks. As shown in FIG. 1, mobile network MNO1 104 may communicate with the switch 108 via signaling channel 2a, while mobile network MNO2 106 may communicate with the switch 108 via signaling channel 2b. Signaling channels 2a and 2b may also utilize SS7.

A computing device 102 may be a device that is used to conduct a transaction or to send and receive data messages over a mobile network 104 and 106. In some embodiments, the computing device 102 is a merchant computer or an acquirer computer. In other embodiments, the computer device may be a mobile device configured to communicate over a mobile network. In such embodiments, the computing device 102 is typically a system for an entity (e.g. a bank) that has a business relationship with a particular merchant or other entity.

The issuer computer 112 is typically a business entity (e.g. a bank) which maintains financial accounts for a user. An acquirer computer is typically a system for an entity (e.g. a bank) that has a business relationship with a particular merchant or other entity. Some entities can perform both issuer computer 112 and acquirer computer functions. Embodiments of the invention encompass such single entity issuer-acquirers.

In system 100 shown in FIG. 1, the computing device 102 is located within the circular area surrounding BTS 106b, representing the geographic region handled by BTS 106b. Hence as shown, computing device 102 is local to BTS 106b. For example, when a user conducts a transaction with a merchant associated with the computing device 102, a transaction request message is generated at the computing device 102 and sent to BTS 106b over the mobile communication network. The PPN conversion module 106b-1 in BTS 106b receives the transaction request message and converts the transaction message from SS7 to an internet protocol (IP). The converted transaction request message in the IP protocol may then be transmitted to the payment processing network server computer 110 along IP network connection 1d. The payment processing network server computer 110 may then perform traditional transaction request message processing. For example, the payment processing network server computer 110 may send the transaction to the issuer computer 112 for authorization or rejection of the transaction.

Figure 2:
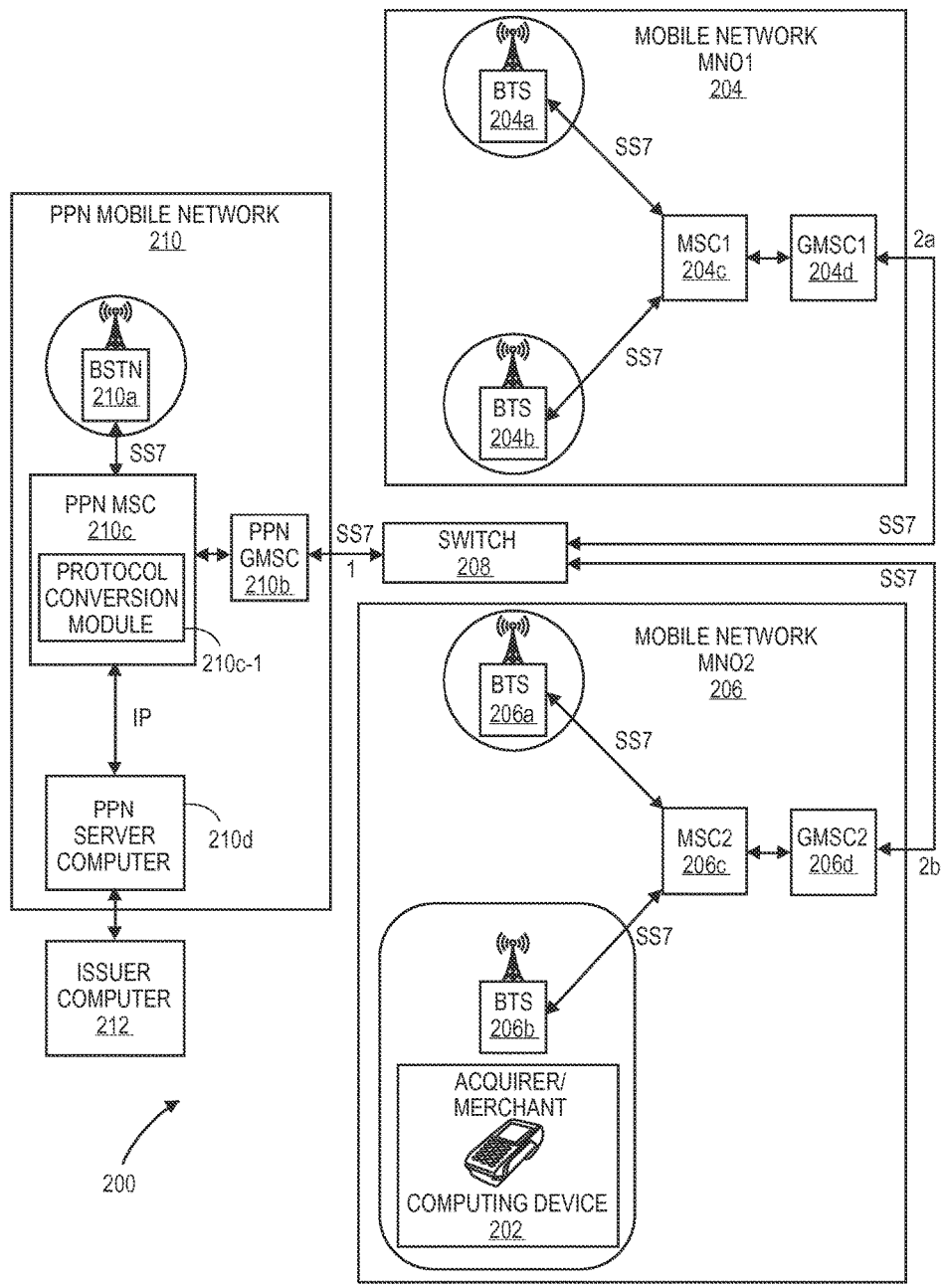
FIG. 2 shows a system diagram for a system configured to transfer data received over a mobile network across a mobile network to a payment processing network mobile network according to an embodiment of the present invention.

FIG. 2 shows a system 200 for transferring data from a computing device 202 to a payment processing network (PPN) mobile network 210 using a mobile communication network according to an embodiment of the present invention. The system 200 may be used to facilitate the communications of data between a computing device 202 and a payment processing network server computer 210d. The system 200 includes a computing device 202, mobile network MNO1 204, mobile network MNO2 206, a switch 208, a PPN mobile network 210, and an issuer computer 212. For simplicity of illustration, a certain number of components are shown in FIG. 2. It is understood, however, that embodiments of the present invention may include more than one of each component. In addition, some embodiments of the present invention may include fewer than all of the components shown in FIG. 2.

The computing device 202 may include a processor and a computer readable medium coupled to the processor, the computer readable medium comprising code, executable by the processor for performing the functionality described below. The computing device 202 may be one of a mobile device, point of sale device, access device, merchant computer, acquirer computer, or any other device that is capable of sending and receiving communications through a mobile network. In some embodiments, the computing device 202 may be located at a merchant or acquirer location. In some embodiments of the present invention, the computing device 202 may include a subscriber identifier issued by the PPN mobile network 210 (e.g., a subscriber identifier stored in a SIM card or other secure module). A SIM card is an integrated circuit that may securely store the international mobile subscriber identity (IMSI) and the related key used to identify and authenticate the computing device 202 as being a subscriber to the PPN mobile network 210. In some embodiments, the SIM card may be provided to subscribers of the PPN mobile network 210 to be placed inside the subscribers' computing devices. In other embodiments, the PPN mobile network 210 may provide the computing devices 202 to the subscriber with the subscriber identifier preloaded into computing devices or with a SIM card pre-installed. The SIM card issued by the PPN mobile network 210 may facilitate the communication of both transaction-related and non-transaction related data between the computing device 202 and the payment processing network server computer 210d by identifying the computing device 202 as being subscribed to the PPN mobile network 210.

The computing device 202 may further include a protocol conversion module configured to encapsulate a transaction request message in a mobile network protocol (e.g., SS7 signaling protocol). The protocol conversion module in the computer device 202 may further be configured to send the encapsulated transaction request message to the base station 206b for transmission through the mobile network MNO2 206, through the switch 208, and to the PPN mobile network 210. The protocol conversion module in the computer device 202 may also be configured to decapsulate transaction response messages received from the PPN mobile network 210 via the mobile network.

As depicted in FIG. 2, mobile network MNO1 204 may include a plurality of base stations ("BTS") 204a and 204b, a mobile switching center MSC1 204c and a gateway mobile switching center GMSC1 204d. Mobile network MNO2 106 may have an identical structure and components as mobile network MNO1 104. However, each mobile network may include additional or fewer components, including different numbers of base stations based on the geographic reach of each mobile network. Mobile network MNO1 104 and mobile network MNO2 106 may be owned and operated by different mobile networks (e.g., telecommunications service providers). Additional details regarding the components of a mobile network are presented below and with respect to FIG. 3.

The base stations (204a, 204b, 206a, and 206b) may be systems that are responsible for handling communications traffic and signaling to the corresponding mobile switching center (204c and 206c). In embodiments of the present invention, a typical base station may include equipment and hardware for transmitting and receiving radio signals, antennas, and equipment for encrypting and decrypting communications. In some embodiments of the present invention, the base stations may communicate with a corresponding mobile switching center via an in-band data channel (e.g., voice or other data channel) and an out-of-band signaling channel (e.g., control signaling channel such as SS7). In some embodiments, the out-of-band signaling channel may use an SS7 communications protocol to facilitate the establishment and release of a telephone connection between devices. The in-band channel may be used to carry voice data (e.g., a telephone call) between devices. The base station may be capable of transmitting and processing communications for any mobile communication protocol. The circular regions surrounding each of the base stations (204a, 204b, 206a, and 206b) are a graphical representation of the geographic coverage area that each base station is configured to send and receive mobile communications to and from computing devices. As shown in FIG. 2, base station 206b may facilitate communications between the computing device 202 and the mobile switching center 206c.

The mobile switching center (204c and 206c) may be a system configured for routing data and signals within the mobile network (204 and 206). The mobile switching center (MSC) may be responsible for routing voice calls, short message service (SMS) messages, and other data through the mobile network (204 and 206). The mobile switching center (204c and 206c) may be configured to set-up and release end-to-end connections and perform handover operations.

The gateway mobile switching center (204d and 206d) may be a system configured to determine which mobile switching center the destination device or system is currently located at. Communications from one computing device (e.g., mobile phones) to another computing device are typically routed from a base station to a switch (e.g., a public switched telephone network) through the gateway mobile switching center (204d and 206d). In some embodiments, the mobile switching center (204c and 206c) and the gateway mobile switching center (204d and 206d) may be a single component within the mobile network performing the functions of both the mobile switching center (204c and 206c) and the gateway mobile switching center (204d and 206d).

The switch 208 may be a device configured to receive and direct communications data between mobile networks. In some embodiments, the switch 208 may be a public switched telephone network that is configured to aggregate interconnected circuit-switching telephone networks. The switch 208 allows mobile and telephone devices to connect to one another. Each mobile network (e.g., MNO1 204 and MNO2 206 in FIG. 2) is connected to the switch 208 to facilitate telephone communications between mobile networks. In some embodiments of the present invention, the switch 208 may utilize a Signaling System No. 7 ("SS7") signaling protocol for the exchange of control information associated with the routing, establishing and release of a telephone communication between mobile networks. As shown in FIG. 2, mobile network MNO1 204 may communicate with the switch 208 via signaling channel 2a, while mobile network MNO2 206 may communicate with the switch 108 via signaling channel 2b. The switch 208 allows mobile network MNO1 204 and MNO2 206 to communicate with each other. The switch 208 may also be operably connected to the PPN mobile network 210 via signaling channel 1. In FIG. 2, the signaling channels (1, 2a, and 2b) may include both in-band (e.g., voice/data) and out-of band (e.g., call setup, data transmission) signaling between the PPN mobile network 210, and the mobile networks (204 and 206).

The PPN mobile network 210 may be comprised of at least a base station (BTS) 210a, a PPN gateway mobile switching center (GMSC) 210b, a PPN mobile switching center ("PPN MSC") 210c, and a payment processing network server computer 210d. The PPN mobile switching center 210c may also be referred to as a central mobile switching device. In some embodiments of the present invention, the PPN mobile network 210 may be owned and operated by a payment processing network (e.g., Visa®, American Express®, MasterCard®).

The PPN mobile switching center 210c may include a processor and a computer readable medium coupled to the processor, the computer readable medium comprising code, executable by the processor for performing the functionality described below. The PPN mobile switching center 210c in the PPN mobile network 210 may further include a protocol conversion module 210c-1. The protocol conversion module 210c-1 may be configured to receive a data message in a first protocol that is encapsulating a data message in a second protocol. For example, the received data message may be an SS7 message (the first protocol) encapsulating a data message generated by the computing device 202 in a second protocol (e.g., an internet protocol). In some embodiments of the present invention, a stream control transmission protocol (STCP) may be used to decode or decapsulate an IP message from an SS7 signal sent to the PPN mobile switching center 210c. In such embodiments, the protocol conversion module 210c-1 may further encapsulate the IP data message into an SS7 signal when sending a data message back to the computing device 202.

In some embodiments, because the SS7 messages being sent to PPN mobile network are not being used to place actual voice calls but are instead being used to transmit transaction information, certain types of SS7 messages or certain portions of SS7 messages that are not required for routing the SS7 messages can be repurposed to encapsulate data messages containing the transaction information. For example, in some embodiments, the transaction information can be encapsulated in the optional parameter fields of a SS7 ISDN user part (ISUP) message, in the optional parameter fields of a SS7 signaling connection control part (SCCP) message, and/or in a SS7 transaction capabilities application part (TCAP) message. In some embodiments, the transaction information may or may not be encapsulated in a SS7 mobile application part (MAP) message.

The protocol conversion module 210c-1 may be capable of receiving, converting, and sending transaction messages or any other communications between entities within a mobile networks system from a central location (e.g., the PPN mobile switching center 210c) within the PPN mobile network 210. Further, the protocol conversion module 210c-1 may be capable of distributing and processing transaction data, consumer requests, notifications, alerts, offers, and any other communications over either a mobile telecommunications network or internet protocol transaction system.

The payment processing network (PPN) server computer 210d may include a processor and a computer readable medium coupled to the processor, the computer readable medium comprising code, executable by the processor for performing the functionality described below. The payment processing network (PPN) server computer 210d may be configured to process transaction request and response messages and determine the appropriate destinations for routing the transaction request and response messages. The payment processing network may also be configured to handle the clearing and settlement of transactions between an issuer and an acquirer. The payment processing network may also be configured to generate and send messages (e.g., notifications, alerts) to issuers, acquirers, or to the computing device 202.

The issuer computer 212 is typically a business entity (e.g. a bank) which maintains financial accounts for a user. An acquirer computer is typically a system for an entity (e.g. a bank) that has a business relationship with a particular merchant or other entity. Some entities can perform both issuer computer 212 and acquirer computer functions. Embodiments of the invention encompass such single entity issuer-acquirers.

In the system 200 shown in FIG. 2, the computing device 202 is located within the circular area surrounding the base station 206b, representing the geographic region handled by the base station 206b. When a user engages in a transaction, for example, with a merchant associated with the computing device 202, or attempts to send a data message for performing a transaction, a message (e.g., a transaction request message) is generated at the computing device and sent to the base station 206b. The base station 206b may then send the message to the MSC2 206c. In some embodiments, the message may be sent on an out-of-band signaling channel (e.g., using an SS7 protocol or other mobile network communication protocol). The message may then be sent to the switch 208 via the GMSC2 206d along signaling channel 2b. The switch 208 routes the converted transaction request message to the PPN mobile network 210 where it may be converted by the protocol conversion module 210c-1 to an IP message before being sent to the payment processing network server computer 210e for processing. Thus, the message from computing device 202 is received at the PPN mobile network 210 via the out-of-band signaling channel, and then subsequently converted into an IP message.

Figure 3:
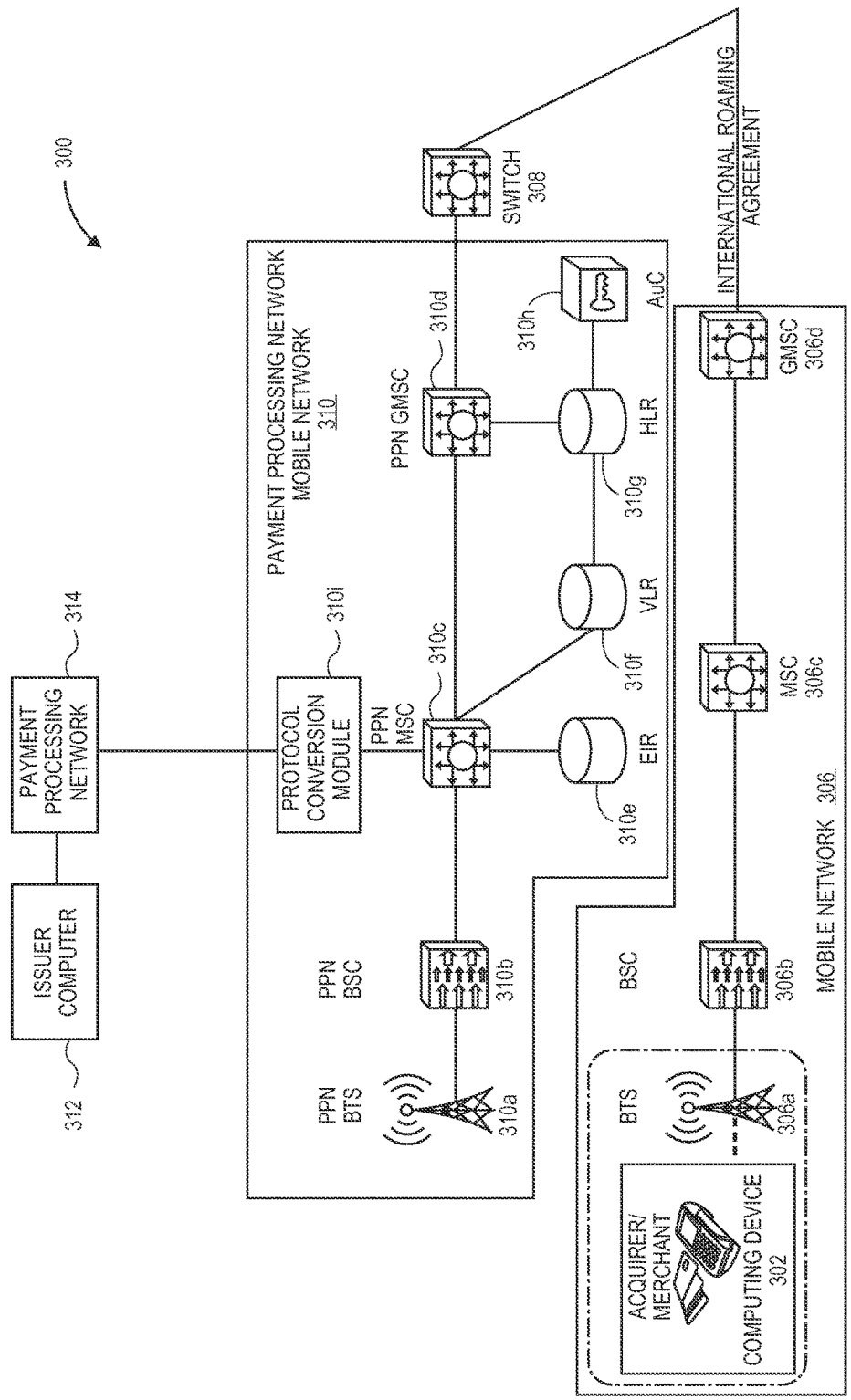
FIG. 3 shows a detailed system diagram for a system configured to transfer data across a mobile network to a payment processing mobile network according to an embodiment of the present invention.

FIG. 3 shows a detailed system diagram for a system configured to transfer data across a mobile network between a computing device 302 and a payment processing network (PPN) mobile network 310 according to an embodiment of the present invention. FIG. 3 shows the devices used for transferring data from the computing device 302 to the PPN mobile network 310 using mobile network communications systems according to an embodiment of the present invention. The computing device 302 may be a subscriber of the PPN mobile network 310. As depicted in FIG. 3, the computing device 302 is roaming or stationed outside of the coverage area of the PPN mobile network 310.

In embodiments of the present invention, the PPN mobile network 310 may comprise the hardware components, databases, and facilities described below, such that subscribers to a payment processing network's mobile payment capabilities may be identified and may communicate across multiple mobile communication networks without the need for third party data conversion systems or infrastructure investment by the payment processing network 314 within other mobile networks. Accordingly, the payment processing network 314 may use the protocol conversion module 310i shown in FIG. 3 to communicate with the computing device 302 located on the mobile network 306 through the use of SS7 signaling channels. The ability of the computing device 302 subscribed to the PPN mobile network 310 to communicate and use services from the mobile network 306 may be based on international roaming agreements between the payment processing network mobile network 310 and the mobile network operator of mobile network 306.

The system 300 includes a computing device 302, a mobile network 306, a switch 308, a payment processing network mobile network 310, an issuer computer 312, and a payment processing network 314. For simplicity of illustration, a certain number of components are shown in FIG. 3. It is understood, however, that embodiments of the present invention may include more than one of each component. In addition, some embodiments of the present invention may include fewer than all of the components shown in FIG. 3. The description of some components and devices in FIG. 3 can be found in the description of FIG. 2 above.

The PPN mobile network 310 may be comprised of at least a PPN base transceiver station (BTS) 310a, a PPN base station controller (BSC) 310b, a PPN mobile switching center (MSC) 310c, a PPN gateway mobile switching center (GMSC) 310d, an equipment identity register (EIR) 310e, a visitor location register (VLR) 310f, a home location register (HLR) 310g, and an authentication center (AuC) 310i. Other mobile networks may also include components similar or identical to those in the PPN mobile network 310.

A base station, as described with respect to FIG. 2 may be composed of a base station tower (BTS) (306a and 310a) and a base station controller (BSC) (306b and 310b). According to some embodiments of the present invention, a computing device 302 may send/transmit and receive signals and data via a base station tower (302a and 306a) and a base station controller (302b and 306b) between the mobile network 306 and the PPN mobile network 310. In some embodiments of the present invention, there may be a plurality of base station towers 302a in communication with a single base station controller 302b.

The equipment identity register (EIR) 302e may be a database storing device data for computing devices in the PPN mobile network 310. The equipment identity register 302e may keep track of all the black listed computing devices (e.g., mobile phones, POS devices, merchant/acquirer computers) that are banned from accessing the PPN mobile network 310 and services provided by the PPN mobile network 310. The black listed computing device may be identified by the computing device's international mobile station equipment identity (IMEI) that may be stored in the SIM card of the computing device. The data stored in the EIR 302e may also be used to track stolen computing devices. In some embodiments, the EIR 302e may be integrated with the home location register (HLR) 302g.

In some embodiments of the present invention, when a computing device 302 tries to communicate with a mobile network (for example, PPN MSC 310), the IMEI of the computing device 302 may be queried against the EIR database 310e to determine whether the computing device 302 is present on the EIR database 310e. If the computing device 302 is on the EIR list, the computing device 302 may be prevented from accessing the PPN mobile network 310.

The visitor location register (VLR) 310f may be a database storing user data and device data for a mobile network. The visitor location register 310f may be a database of the subscribers (e.g., computing devices) that are presently located within the coverage area of a particular mobile switching center (MSC). For example, the computing device 302 in FIG. 3 is in the coverage area of the mobile network 306 (specifically within the coverage area of the base station transceiver 306a) and the device data for the computing device 302 may be stored in a visitor location register associated with the mobile network 206 (not shown). The visitor location register 310f may receive the user data and device data from the home location register (HLR) 310g, which holds permanent data regarding the mobile network's subscribed computing devices.

In some embodiments of the present invention, the visitor location register 310f may include, but is not limited to, the subscriber identifier (e.g., an international mobile subscriber identity (IMSI)), a connection identifier associated with the subscriber identifier (e.g., a mobile subscriber integrated services digital network-number (MSISDN)), the mobile network services that the subscriber (e.g., computing device 302) is allowed to access, and the home location register address of the computing device 302.

In embodiments of the present invention, when the computing device 302 moves into the coverage area of the mobile network 306, the corresponding record is updated in the visitor location register of the mobile network 306. Subsequently, the home location register 310g of the PPN mobile network 310 is automatically notified of the change so that the record in the home location register 310g for the computing device 302 is updated with the roaming location of the computing device 302. As the computing devices in the visitor location register 310f may be those that are presently in the coverage area of the PPN mobile switching center 310c, the data entries change frequently and may be deleted once a computing device has moved out of the coverage area. The notifications and control messages sent between the various mobile network HLRs, VLRs, and other components may be out-of-band communications messages transmitted across an out-of-band signaling channel (e.g., SS7 communications signaling channel). In some embodiments, the HLRs and VLRs can exchange information using other network protocols (e.g., IP).

The home location register (HLR) 310g may be a database storing user data and device data for a mobile network. The data stored by the home location register 310g may include the subscriber identifier (e.g., an international mobile subscriber identity (IMSI)) and a connection identifier associated with the subscriber identifier (e.g., a mobile station international subscriber directory number (MSISDN)) of the computing device 302 and all other computing devices that are subscribed to the PPN mobile network 310. The subscriber identifier (e.g., IMSI) is used to uniquely identify each Subscriber Identity Module (SIM). The IMSI may also be used as the primary key for each home location register 310g record. The connection identifier (e.g., MSISDN) may include the telephone number for each subscribed computing device. The home location register 310g record for each computing device may also include the current location of the computing device 302, which may be obtained from the visitor location register of a mobile network 306 in which the computing device 302 is roaming in. The home location register 310g record for each computing device 302 may be updated when the SIM associated with the device moves into another area covered by a different mobile network 306. The subscriber information that is passed between the home location register of the PPN mobile network 310 and the visitor location register of the mobile network 306 may be passed using an Update Location Message sent across out-of-band signaling channels (e.g., an SS7 signaling channel) or through an IP network.

The authentication center (AuC) 310h is a component in a mobile network system that may be configured to facilitate the process of authenticating each subscriber identity module (SIM) card that attempts to connect to the PPN mobile network 310. In some embodiments, each SIM card is assigned an authentication key (K). The authentication key is also provided to the AuC 310h. During the authentication process, the authentication key, a random number, and an algorithm identifier are provided to the mobile switching center 310c for generating a first secure value using the authentication key and the random number. The random number is sent to the SIM, which is used to generate a second secure value. The second secure value is sent back to the mobile switching center 302c and compared to the first secure value. If the first secure value and the second secure value match, the SIM card is authenticated. Successful authentication of the SIM card (and thus the corresponding computing device 302), allows the computing device 302 to utilize the services provided by the PPN mobile network 310.

In alternative embodiments of the present invention, the computing device 302 may be a Wi-Fi computing device. In such embodiments, in the absence of a SIM card, the authentication center 310h may store user login data or other user credentials (e.g., email address, e-wallet credentials) in order to authenticate the computing device 302. In such embodiments, the authentication center 310h may require additional databases or additional fields to store authentication data for Wi-Fi computer devices, and/or may require alternative authentication systems to perform non-SIM card data authentications.

The mobile network 306 may be a second mobile network 306 that is separate from the PPN mobile network 310 and may be operated by a second mobile network provider. The mobile network 306 may include a base transceiver station (BTS) 306a, a base station controller (BSC) 306b, a mobile switching center (MSC) 306c, a gateway mobile switching center (GMSC) 306d. Although not depicted, the mobile network 306 may have similar components to the PPN mobile network 310, including an EIR, VLR, HLR, and AuC.

The payment processing network (PPN) server computer 314 may include a processor and a computer readable medium coupled to the processor, the computer readable medium comprising code, executable by the processor for performing the functionality described below. The payment processing network (PPN) server computer 314 may be configured to process transaction request and response messages and determine the appropriate destinations for routing the transaction request and response messages. When the transaction is a payment transaction, the payment processing network server computer may be configured to process transaction request and response messages. The payment processing network 314 may also be configured to handle the clearing and settlement of transactions between an issuer computer 312 and an acquirer computer 302. The payment processing network 314 may also be configured to generate and send messages (e.g., notifications, alerts) to issuer computers 312 or to the computing device 202 (e.g., mobile devices, merchant computers, acquirer computers, etc.). In some embodiments of the present invention, the payment processing network 314 may include one or more of an authorization module, a routing module, a clearing and settlement module, and a messaging module.

The authorization module may comprise functionality in order to generate and transmit authorization messages to an issuer computer 312 associated with a transaction in order to complete the transaction. Accordingly, the authorization module may generate, transmit, or process any authorization request messages associated with transactions, the processing of e-commerce transactions, or any other functionality in line with typical payment processing functions.

The routing module may be configured to route messages to and from the appropriate destination, such as the issuer computer 312, as part of transaction processing. The routing module may further handle the routing of clearing and settlement messages or files between the computing device 302 and the issuer computer 112 related to the clearing and settlement process.

The clearing and settlement module may comprise all of the clearing and settlement functionality of the payment processing network 314. For example, the clearing and settlement module may perform the clearing and settlement functions at a predetermined interval or time (e.g., at the end of a business day) for transactions conducted by a merchant. An example of the clearing and settlement module is the Base II data processing system, which provides clearing, settlement, and other interchange-related services.

The messaging module may send and receive transaction request messages and transaction response messages, including authorization request and response messages, as well as generate and send notification messages, incentive messages, rewards messages, etc.

C. Methods

Methods according to embodiments of the invention can be described with respect to FIGS. 2-3. FIG. 4 is a flowchart describing a method of processing a transaction using a payment processing network mobile network 310 shown in FIG. 3.

In step 402, a mobile switching center (e.g., PPN mobile switching center 310c) associated with a first mobile network (e.g., the PPN mobile network 310) operated by a payment processing server 314 receives a transaction request message from a computing device 302 communicating with a second mobile network (e.g., mobile network 306). In some embodiments, the transaction request message may be an authorization request message. In some embodiments, the transaction request message may be received by the mobile switching center 310c via a switch 308 (e.g., a public switch telephone network). In embodiments of the present invention, the second mobile network may be remote from the first mobile network 310. In such embodiments, the computing device 302 may be local to the second mobile network 306 in that the computing device 302 is communicating with the second mobile network 306 via a base transceiver station 306a associated with the second mobile network 306. In embodiments of the present invention, the transaction request message is received by the PPN mobile switching center 310c via a switch 308 communicatively coupling the PPN mobile network 310 and the mobile network 306.

For example, the computing device 302 may be a point of sale device at a merchant, where the computing device 302 includes a SIM card issued by the PPN mobile network 310. The consumer may engage in a transaction with the merchant by swiping a payment device through a computing device 302 in the form of a point of sale (POS) terminal or merchant access device (e.g., ATM), or by passing the payment device within proximity to the POS terminal. In some embodiments, the POS terminal may extract Track 2 data (e.g., a primary account number (PAN), expiration date, CVV, etc.) from a magnetic stripe portion or contactless communication (e.g., near-field communication (NFC)) element of a payment device. In some embodiments, a token or other account identifier substitute may be generated or stored in the payment device instead of the primary account number. The POS terminal may use the Track 2 data to generate a transaction request message (e.g., an authorization request message) including the transaction details (e.g., transaction amount, merchant identifier, payment data, CVV, encrypted PIN), to send to an issuer for approval or rejection of the transaction. In some embodiments, the transaction request message may be an ISO 8583 message used for financial transaction.

When a consumer engages in a transaction with the merchant using the computing device 302, the computing device 302 may generate and send the transaction request message to the base transceiver station 306a associated with the mobile network 306. In embodiments of the present invention, the computing device 302 may send the transaction request message to the base transceiver station 306a that the computing device 302 is in range of or communicating with. A base transceiver controller 306b associated with the base transceiver station 306a may send the transaction request message to the mobile network mobile switching center 306c using an SS7 signaling protocol. In such embodiments, the transaction request message may be in an internet protocol and encapsulated within an SS7 signal.

The transaction request message may include a recipient identifier identifying the destination of the transaction request message or identifying the mobile network that the computing device 302 is subscribed to (e.g., the PPN mobile network 310). The mobile network mobile switching center 306c may then query a visitor location register associated with the mobile network 306 to determine the PPN mobile network 310. After determining the PPN mobile network 310, the mobile switching center 306c of the second mobile network 306 may send the transaction request message to the switch 308 via a gateway mobile switching center 306d. In some embodiments, an international roaming agreement may be established between the PPN mobile network 310 and the mobile network 306 before the mobile network 306 will send the transaction request message to the PPN mobile network 310. The switch 308 may then send the transaction request message to the PPN mobile switching center 302c in the PPN mobile network mobile 310 via the PPN gateway mobile switching center 310d.

In step 404, the transaction request message is converted from a first protocol to a second protocol by a protocol conversion module 310i. In some embodiments of the present invention, the first protocol may be an SS7 signal protocol and the second protocol may be an internet protocol. Once the PPN mobile switching center 310c receives the transaction request message, the transaction request message may be sent to the protocol conversion module 310i. In embodiments of the present invention, the protocol conversion module 310i may be a module within the PPN mobile switching center 310c. In other embodiments, the protocol conversion module 310i may be separate from the PPN mobile switching center 310c but within the PPN mobile network 310.

In embodiments of the present invention, converting the transaction request message may include using a stream control transmission protocol to decapsulate and/or decode the transaction request message that was encapsulated within an SS7 signaling message.

In step 406, the converted transaction request message is sent to the payment processing network server computer 314. Once the payment processing network server 314 receives the converted transaction request message, the payment processing network server computer 314 may process the transaction contained in the converted transaction request message. This process may include determining an appropriate issuer computer 312 associated with the transaction, and receiving and processing authorization messages for the transaction.

The processing steps performed by the payment processing network server computer may be the same as traditional authorization processes that the payment processing network server computer is configured to process. Further, the payment processing network server computer 314 may be configured to process transaction request messages in IP.

In step 408, a mobile switching center 310c receives a transaction response message from the payment processing server 312. The transaction response message may include a response to the transaction request sent from the computing device 302. In other embodiments, the transaction response message may include one or more of a notification message, a coupon, a receipt, and/or a reward, etc. In some embodiments the transaction response message may be sent by the payment processing server 312 in an internet protocol. In embodiments of the present invention, the transaction response message may be sent to the PPN mobile switching center 310c in the PPN mobile network 310 using the IP protocol.

In step 410, the transaction response message is converted from the second protocol (e.g., IP protocol) to the first protocol (e.g., SS7 signaling protocol). The transaction response message may be converted (e.g., encapsulated into an SS7 signaling protocol) by the protocol conversion module 310i prior to being sent back to the computing device 302 over the mobile communication network infrastructure. In some embodiments of the present invention, the transaction response message from the payment processing network 110 may be in an internet protocol. In other embodiments, the transaction response message may be in a different network protocol. In such embodiments, the protocol conversion module 310i may encapsulate the transaction response message into an SS7 message for transmission to through the mobile networks system 300.

In step 412, the converted transaction response message is sent to the computing device 302 via the switch 308. In embodiments of the present invention, the PPN mobile switching center 310c may determine the location of computing device 302 as the computing device 302 is currently on a different mobile network (e.g., the computing device 302 is roaming on mobile network 306). In order to locate the mobile switching center 306c of the mobile network 306 that the computing device 302 is on, the PPN mobile switching center 310c may query the home location register 310g with the MSISDN number of the computing device 302. Typically, when a computing device subscribed to a mobile network is roaming, the visitor location register of the mobile network that the computing device is currently roaming on will send a location update message to the home location register of the home mobile network of the computing device. Thus, in embodiments of the present invention, when the computing device 302 entered the range of the base transceiver station 306a of the mobile network 306, the visitor location register of the mobile network 306 would generate and send a location update message to the home location register 310g of the PPN mobile network 310. This allows the PPN mobile network 310 to store updated data on the location of the computing device 302 (and all other computing devices subscribed to the PPN mobile network 310) in the home location register 310g.

The home location register 310g may send to the visitor location register of the mobile network 306 a provided roaming number (PRN) message to obtain the mobile station roaming number (MSRN) of the computing device 302. The home location register 310g will then be able to route the call to the correct mobile switching center 306c. The PRN message may be sent using a mobile application part (MAP) protocol, which is an SS7 protocol that provides an application layer for the various nodes and components in mobile networks to communicate with each other in order to provide services to computing device (e.g., mobile device) users.

Using the international mobile subscriber identity (IMSI) contained in the PRN message, the visitor location register in the mobile network 306 assigns a temporary number (e.g., the mobile station roaming number (MSRN)) to the computing device 302. The MSRN number is sent back to the home location register 310g in a RIA (Routing Information Acknowledgement) message. Using the MSRN number, the PPN gateway mobile switching center 310d may route the transaction response message to the computing device 302 via the switch 308.

Accordingly, embodiments of the invention allow a payment processing network to send and receive communications generated in a known processable protocol by the payment processing network server computer across mobile network communication infrastructure by encapsulating the messages into a mobile network signaling protocol. In this manner, transaction data originating from around the world can be passed to the payment processing network at a central location using just mobile and/or telephony networks by utilizing the roaming capabilities of such networks without requiring IP network connectivity between a local base station and the payment processing network.

II. Location-Aware Communications System

Some embodiments of the integrated communications network may implement a location-aware network communications system that may allow a payment processor to obtain additional information about a consumer using a location-aware header of a network communication. The information passed in the location-aware header may allow the payment processor the ability to provide more effective authentication of a consumer during a transaction and provide additional fraud analysis, consumer advertising targeting, and any other applications relevant to a payment process. For example, a location-aware network header may include a merchant identifier (e.g., a unique identifier associated with a merchant, service provider, government entity, or any other registered party), a location identifier (e.g., a particular merchant's store location, a location within a merchant's store, etc.), a mobile device identifier (e.g., a hardware identifier for the mobile device, a phone number, a device manufacturer serial number, etc.), a consumer identifier (e.g., mobile wallet identifier, payment account user name, a phone number, etc.), transaction type indicator (e.g., tracking, payment transaction, etc.), or any combination thereof in order to obtain additional information about the consumer, a transaction, a merchant, etc. in order to better authenticate, predict consumer behavior, and secure transaction communications.

Furthermore, the location-aware header may be integrated with existing payment systems by incorporating the location-aware information into a network communication header instead of in a transaction payload. For example, the location-aware header may be transmitted in the network protocol header along with an existing payment message (e.g., ISO 8583 standard payment authorization request message) to a payment processor that may parse the information in the location-aware header message before processing the existing payment message using existing transaction processing systems. The payment processor may then use the additional information provided in the location-aware header to further authentication, validate, and complete the transaction. Accordingly, embodiments may be incorporated into existing payment systems at the network communication level without requiring different payment standards and authorization systems. The location-aware header may also be used to provide additional services, including incentive or rewards issuance, and notification or alert messaging services.

Furthermore, the location-aware infrastructure provides a benefit by allowing a merchant to target-market to individual consumers. Using the location terminals, the merchant may be able to locate the consumer to a particular type of product or area of the merchant store containing a particular type of product. This data can be sent to the internet controller in the payment processing network to generate an advertisement, coupon, deal, etc. that is directly relevant to the consumer's shopping experience. In embodiments where the data from the location terminals is regularly sent through the location-aware system, the most relevant offers and promotions may be generated. This saves resources that may be expended sending all offers or promotions to all consumers.

A. Definitions

Prior to discussing embodiments of the invention, descriptions of some terms may be helpful in understanding embodiments of the invention.

The term "network protocol packet" may refer to a formatted unit of data carried by a network. Network protocol packets typically include a network protocol header (e.g., control) portion and a data (e.g. payload) portion. The network protocol header may include control data that provides routing, security, and error detection information the network typically requires to deliver the information in the data portion. For example, the network protocol header may include source and destination network addresses, error detection codes, and sequencing information. An example of a network protocol packet may be a TCP/IP packet.

The term "location-aware header" may refer to a portion of the network protocol header. The location-aware header may store the location-aware data retrieved by location terminals and POS terminals. In embodiments of the present invention, the location-aware header may be embedded within the traditional network header by repurposing existing fields of the tradition network header, or be prepended, appended, or inserted into the traditional network header. The location-aware header may include fields for location-aware data.

The term "transaction payload" may refer to a data portion of a network protocol packet. In some embodiments of the present invention, the transaction payload may include transaction data for a financial transaction (e.g., payment data, transaction total, consumer data). The transaction data in the transaction payload may be used for processing the financial transaction. The transaction data may be in any suitable format and may include any suitable information depending on the purposes of the transaction payload. For example, the transaction payload may include data related to a non-financial transaction, including alert data, incentive data, product data, etc.

The term "location-aware data" may refer to data accessed by merchant devices. The location-aware data may include mobile device data (e.g., mobile device identifier), merchant data (e.g., a merchant identifier), consumer data (e.g., a consumer identifier), location data (e.g., a location identifier), and transaction type data. The location-aware data may be retrieved from a mobile device associated with a user, from a POS terminal used to conduct a transaction with the mobile device, or from any other suitable sources associated with a transaction.

The merchant identifier may be a previously assigned identification number for a merchant. In some embodiments, the merchant identifier may be a numeric or alphanumeric value. The location identifier may be an identifier corresponding to a physical address or some other geographic location. In one embodiment, the location identifier may correspond to an address of the merchant location, which may be stored in a database associated with the payment processing network. The device identifier may correspond to an identifier of the mobile device. In one embodiment, the device identifier may correspond to data stored on a subscriber identity module (SIM) of the mobile device. The consumer identifier may correspond to an identifier of the consumer associated with the mobile device. In one embodiment, the consumer identifier may be a digital wallet number, an email address, a phone number, or other consumer data.

The term "in proximity to" may refer to the location of devices relative to each other. In some embodiments of the present invention, the location terminals at a merchant location may have a coverage area within which the location terminal can retrieve data from mobile devices. When a mobile device is in the coverage area of the location terminal, the mobile device may be considered in proximity to the location terminal.

The term "consumer-targeted message" may refer to a type of message sent to a consumer. In embodiments of the present invention, a consumer-targeted message may include an alert, notification, coupon, advertisement, offer, or rewards associated with a merchant. In embodiments of the invention, incentives may be targeted and location-based. For example, based on location data and merchant data in the location-aware header, the internet controller may generate an incentive for a specific merchant or a specific product based on the merchant location or a specific location of the mobile device within the merchant location. The consumer-targeted message may be sent to the consumer through a mobile network and displayed on the consumer's mobile device or on a merchant point of sale device.

The term "authorization process" may refer to process conducted as part of transaction processing. Typically, an authorization process involves a payment processing network and an issuer of a payment account or payment device. The authorization process may involve the generation and sending of authorization request messages to an issuer to authorize a financial transaction involving a consumer account issued by the issuer, and an authorization response message from the issuer indicating an authorization or rejection of the transaction.

The term "validating the transaction" may refer to process conducted using location-aware data. The process of validating the transaction may include comparing data stored in the consumer profile with the location-aware data from the location-aware header portion. The transaction may be validated when the data stored in the consumer profile matches the location-aware data received in the location-aware header portion.

In embodiments of the present invention, when a transaction associated with transaction data is authorized by an issuer, the internet controller in the payment processing network may conduct an additional validation or verification step. This additional validation may use the location-aware data, which includes data not typically transmitted as part of transaction data for the transaction. For example, the internet controller may evaluate a consumer table comprising entries for consumers based on past transaction history. The consumer table may include a device identifier and a consumer identifier associated with the device identifier. If the location-aware data includes a device identifier and/or a consumer identifier that do not match the data in the consumer table, the internet controller may decline to validate the transaction.

The term "location terminal" may refer to a merchant communications apparatus. The location terminal may be a sensing apparatus configured to detect the presence of the mobile device at or near a merchant location. In some embodiments, a single merchant or location have a plurality of location terminals. In some embodiments, the location terminal may be a standalone device located at a merchant. In other embodiments, the location terminal may be contained within (or integrated with) a POS terminal at the merchant. The location terminal may further be configured to collect information (e.g., consumer data, payment data, device data) associated with mobile device. In some embodiments, the mobile device may include an application configured to send the consumer data and device data, stored in the memory or the mobile device, to the location terminal. In some embodiments of the present invention, consumer presence may be detected when a consumer is at or near the location terminal, and the credentials associated with the consumer (e.g., a payment processing network SIM card) may be collected by intercepting the mobile network communication messages frequently being sent from mobile devices. The retrieved data may be placed (or stored) in a location-aware header portion of a network protocol header of a network protocol packet. In some embodiments, the information collected by the location terminal may be used for multiple purposes, such as, enhanced risk analysis, fraud detection, authentication, advertisements, incentives, payment processing, etc. Although discussed in terms of merchant use, the location terminal is not limited only to applications at merchants and may be implemented by any entity, as one of ordinary skill in the art would recognize.

The term "location proxy device" may refer to a merchant communications apparatus. The location proxy device may be configured as a merchant proxy for securely providing the information collected by the location terminal to an internet controller of the payment processing network. The data may be provided in a network packet via any suitable communications network (e.g., the Internet). The location proxy may be configured to receive a network protocol packet from one or more location terminals and store transaction data generated by a point of sale device into a transaction payload of a network protocol packet. The location proxy may provide secured and certified communications between different network communication devices. In some embodiments, merchant data, location data, device data, and consumer data may also be transmitted to the internet controller via a network packet. The functions of the location proxy may be implemented in hardware or as a plug-in software module.

The term "point of sale device" may refer to a device that can be used to initiate a transaction. In some embodiments, a point of sale device can interact with a portable consumer device (e.g., a payment card or other payment device) during a transaction. According to embodiments of the invention, the point of sale device can be in any suitable form. Examples of point of sale devices may include merchant access devices, cellular phones, PDAs, personal computers (PCs), tablet PCs, handheld specialized readers, set-top boxes, electronic cash registers, automated teller machines (ATMs), virtual cash registers, kiosks, security systems, access systems, and the like. Any suitable point of sale devices may be used including card or mobile device readers. The card or mobile device readers may include any suitable contact or contactless mode of operation. For example, exemplary readers can include RF (radio frequency) antennas, magnetic stripe readers, etc. to interact with portable consumer devices.

B. Systems

Figure 5:
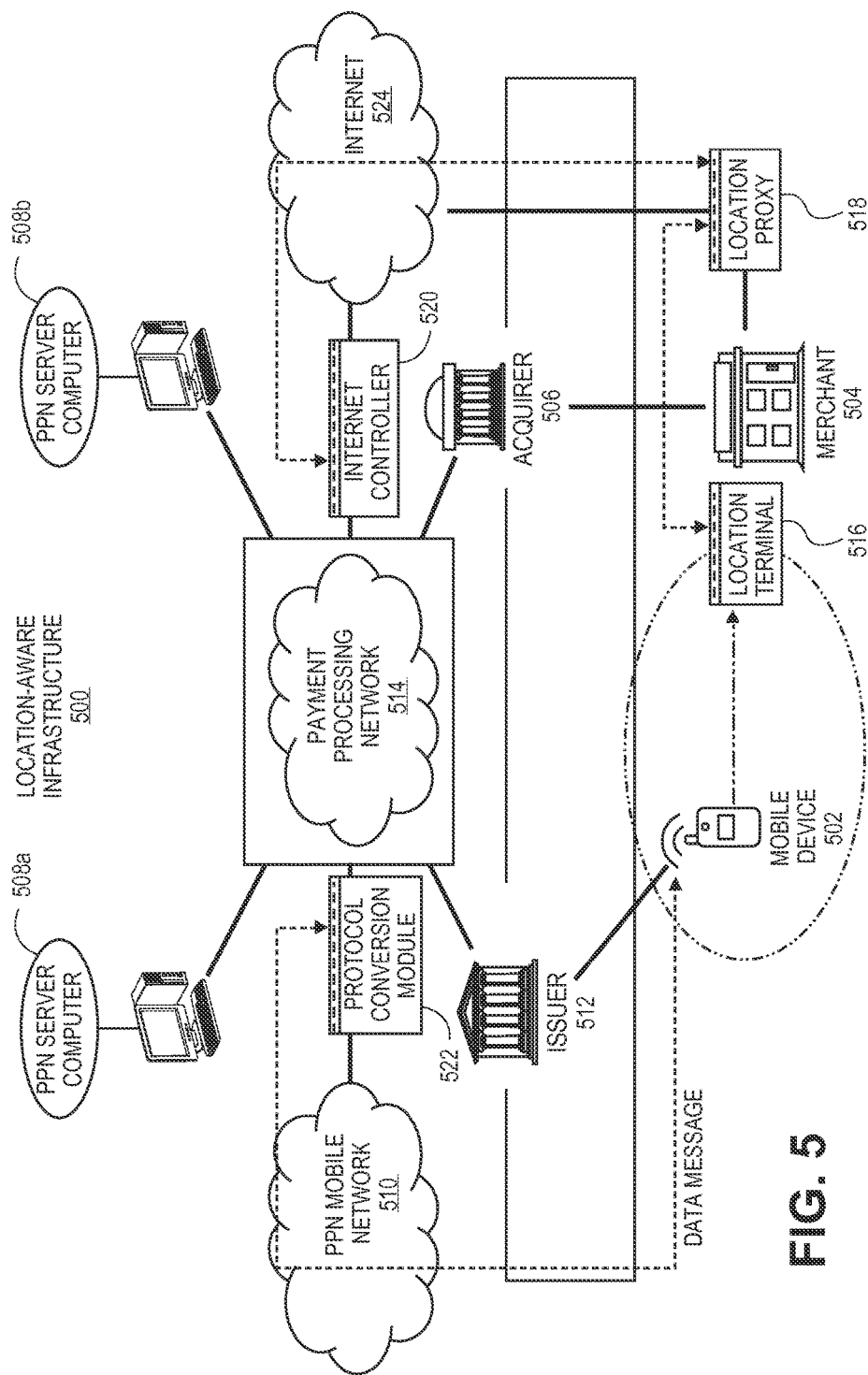
FIG. 5 show a transaction processing system with location-aware infrastructure according to one embodiment of the present invention.

FIG. 5 shows a transaction processing system 500 with location-aware infrastructure according to some embodiments of the present invention. The system 500 may be used to facilitate the communications of data between a mobile device 502 and a payment processing network 514. The system 500 includes traditional transaction-related entities including a merchant 504, an acquirer 506, an issuer 512, and the payment processing network 514 (which may include one or more payment processing network server computers 508a and 508b serving a single payment processing network 514). The system 500 also includes a mobile device 502, which may include consumer account data for a consumer account associated with the issuer 512. The location-aware infrastructure includes the location terminal 516, the location proxy 518, and the internet controller 520. For simplicity of illustration, a certain number of components are shown is shown in FIG. 5. It is understood, however, that embodiments of the present invention may include more than one of each component. In addition, some embodiments of the present invention may include fewer than all of the components shown in FIG. 5.

The mobile device 502 may be in any suitable form. For example, suitable mobile devices 502 can be hand-held and compact so that they can fit into a consumer's pocket (e.g., pocket-sized). The mobile device 502 can include a processor, and memory, input devices, and output devices, operatively coupled to the processor. Specific examples of portable consumer devices include cellular or wireless phones, personal digital assistants (PDAs), pagers, portable computers, smart cards, and the like.

In a typical transaction, a consumer associated with the mobile device 502 may purchase a good or service at the merchant 504 using the mobile device 502. For example, the consumer may pass the mobile device 502 near a contactless reader in a POS terminal at the merchant 504. In other embodiments, the consumer associated with the mobile device 502 may be moving through a merchant location and data may be retrieved from the mobile device 502 by one or more locational terminals 516.

An issuer 512 is typically a business entity (e.g., a bank) which issues and maintains consumer accounts for a consumer. The issuer may issue payment devices for the consumer account including credit cards, debit cards, etc., and/or may provide consumer accounts stored and accessible via the mobile device 502 of the consumer. An acquirer 506 is typically a business entity (e.g., a commercial bank) that has a business relationship with a particular merchant or other entity and that may be involved in the process of transaction. The acquirer 506 may issue and manage accounts for merchants and exchange funds with the issuer 512 on behalf of the merchant. Some entities can perform both issuer and acquirer functions. Embodiments of the present invention encompass such single entity issuer-acquirers. The payment processing network 514 may provide transaction authorization and clearing and settlement services between the acquirer 506 and the issuer 512.

The location terminal 516 may include a processor and a computer readable medium coupled to the processor, the computer readable medium comprising code, executable by the processor for performing the functionality described below. The location terminal 516 may be a sensing apparatus configured to detect the presence of the mobile device 502 at or near a merchant location. In some embodiments, the location terminal 516 may be a standalone device located at a merchant 504. In other embodiments, the location terminal 516 may contained within a POS terminal at the merchant 504. The location terminal 516 may be configured to collect information (e.g., consumer data, payment data, device data) associated with mobile device 502. In some embodiments, the mobile device 502 may include an application configured to send the consumer data, payment data, and device data, stored in the memory or the mobile device 502, to the location terminal 516. In some embodiments of the present invention, consumer presence may be detected when a consumer is at or near the location terminal 516, and the credentials associated with the consumer (e.g., a payment processing network SIM card) may be collected. In some embodiments, the information collected by the location terminal 516 may be used for multiple purposes, such as, enhanced risk analysis, fraud detection, authentication, advertisements, incentives, payment processing, etc. Although discussed in terms of merchant use, the location terminal 516 is not limited only to applications at merchants and may be implemented by any entity, as one of ordinary skill in the art would recognize.

The location proxy 518 may include a processor and a computer readable medium coupled to the processor, the computer readable medium comprising code, executable by the processor for performing the functionality described below. The location proxy 518 may be a merchant communications apparatus configured as a merchant proxy for securely providing the information collected by the location terminal 516 to an internet controller 520 of the payment processing network 514. The data may be provided in a network packet, as described in further detail in FIG. 9 below, via any suitable communications network (e.g., the Internet 524). The location proxy 518 may provide secured and certified communications between different modules. In some embodiments, merchant data, device data, and consumer data may also be transmitted to the internet controller 520 via the network packet. The functions of the location proxy 518 may be implemented in hardware or as a plug-in software module.

Communications between the location proxy 518 and the internet controller 520 may be conducted over a communications network (e.g., the Internet 524). The communications network may include a wireless connection, hardwired open network, or closed hardwired network.

The internet controller 520 may include a processor and a computer readable medium coupled to the processor, the computer readable medium comprising code, executable by the processor for performing the functionality described below. The internet controller 520 may be configured as a controller that communicates with various location proxies 518 to aggregate consumer and/or transaction information over the Internet 524 or any other suitable communications network or medium on behalf of a payment processing network 514. In some embodiments, the internet controller 520 may provide additional services in transaction processing including parsing a location-aware header from a network protocol packet, validating transactions, and performing additional analyses using the data included in the location-aware header. In some embodiments, the internet controller 520 is a module within the payment processing network 514. In other embodiments, the internet controller 520 is a separate entity from the payment processing network 514 and configured to aggregate and send data to the payment processing network 514.

In some embodiments, communications between the payment processing network 514 and the mobile device 502 may be conducted through a network such as the Internet. In other embodiments of the present invention, the communications between the payment processing network 514 and the mobile device 502 may be conducted through a PPN mobile network 510 via a protocol conversion module 522. The protocol conversion module may be implemented using the systems described above with respect to FIGS. 2-4. In such embodiments, communications may be sent using mobile network protocols (e.g., SS7 communication protocol).

Figure 6:
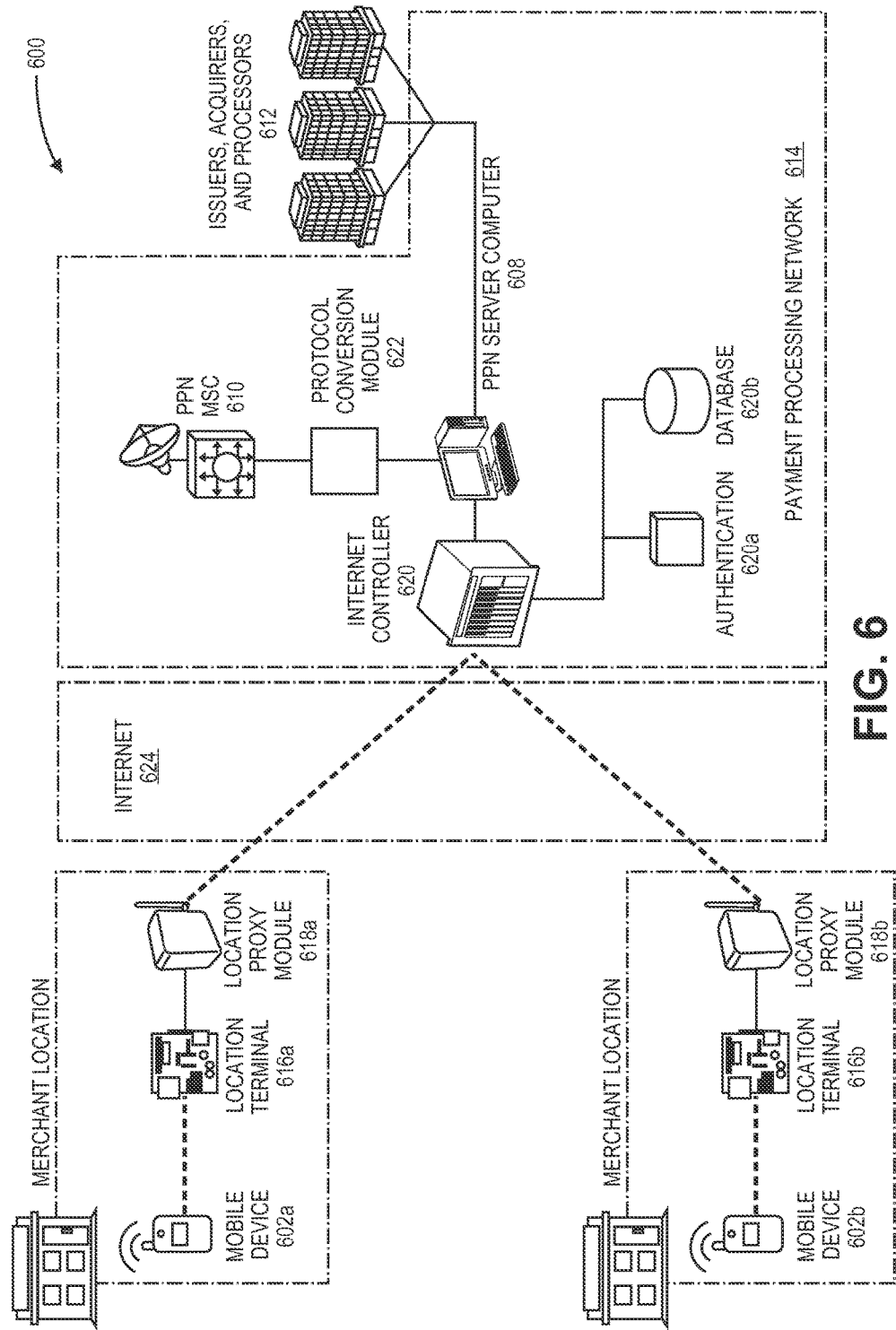
FIG. 6 shows a detailed system diagram for a transaction system with location-aware infrastructure according to an embodiment of the present invention.

FIG. 6 shows a detailed system diagram 600 for a system with location-aware infrastructure according to an embodiment of the present invention. The system 600 illustrates how each merchant location may aggregate the data specific to its location via location terminals (616a and 616b) and location proxies (618a and 618b), and transmit the data over the Internet to a single internet controller 620 associated with a payment processing network 614. Each merchant location in FIG. 6 may be for a different merchant location for the same merchant, or each merchant location may be a different merchant location representing different merchants. For example, the merchant may a plurality of locations and either one location proxy module 618a aggregating the data for the plurality of location, or each of the plurality of locations may include a location proxy module 618a.

The internet controller 620 may analyze the data and information received from each location proxy 618a and determine targeted offers for each consumer associated with each mobile device (602a and 602b). For example, the internet controller 620 may generate a coupon (e.g., 20% off total purchase) for the consumer associated with the mobile device (602a and 602b) that can be used at a merchant at the merchant location. In some embodiments, the coupon offer may be generated based on the consumer's profile (e.g., purchase history at that merchant location). For example, the consumer profile may be stored in a database 620b accessible by the internet controller 620. The database 620b may include the consumer tables described in further detail below in reference to FIG. 10. In another example, the internet controller 620 may generate an advertisement for a sale occurring at the merchant location that may be transmitted to the mobile device (602a and 602b). In yet another example, the internet controller 620 may transmit a list of businesses (e.g., food vendors, banks, movie theaters, shopping malls) in proximity to the merchant location to the mobile device (602a and 602b).

In embodiments of the present invention, the internet controller 620 may transmit a data message back to the mobile device 602a via a communications network. The data message may include a targeted offer (e.g., coupon, advertisement) for the consumer associated with the mobile device 602a. The data message may be sent to the mobile device 602a through the PPN mobile switching center 610 associated with the payment processing network 614. In such embodiments, the data message may be sent from the PPN server computer 608, through a protocol conversion module 622, and across a PPN mobile network as previously described with respect to FIG. 2-4. In alternative embodiments, the data message may be sent through a third party mobile network. Additionally, in some embodiments, the internet controller 620 may send the data message through an internet protocol to the location proxy 618a to provide the coupon to the consumer through the location terminal 616a (e.g., merchant POS terminal or access device).

In some embodiments, when the mobile device 602a conducts a financial transaction with the merchant, transaction data may be sent to the internet controller 620. The payment processing network 614 may also be associated with a payment gateway of issuers, acquirers and processors 612 that performs steps for authorizing a transaction associated with the transaction data (e.g., authorizing the transaction associated with an authorization request message). In such embodiments, an authorization response message is transmitted by the PPN mobile switching center 610 to the mobile device 602a associated with the consumer. The payment gateway of issuers, acquirers and processors 612 may also be configured to store and provide data for consumer-targeted messages including alerts, notifications, coupons, advertisements, and rewards data. The data for the consumer-targeted messages may be stored in databases accessible through the payment gateway of issuers, acquirers and processors 612.

Figure 9:
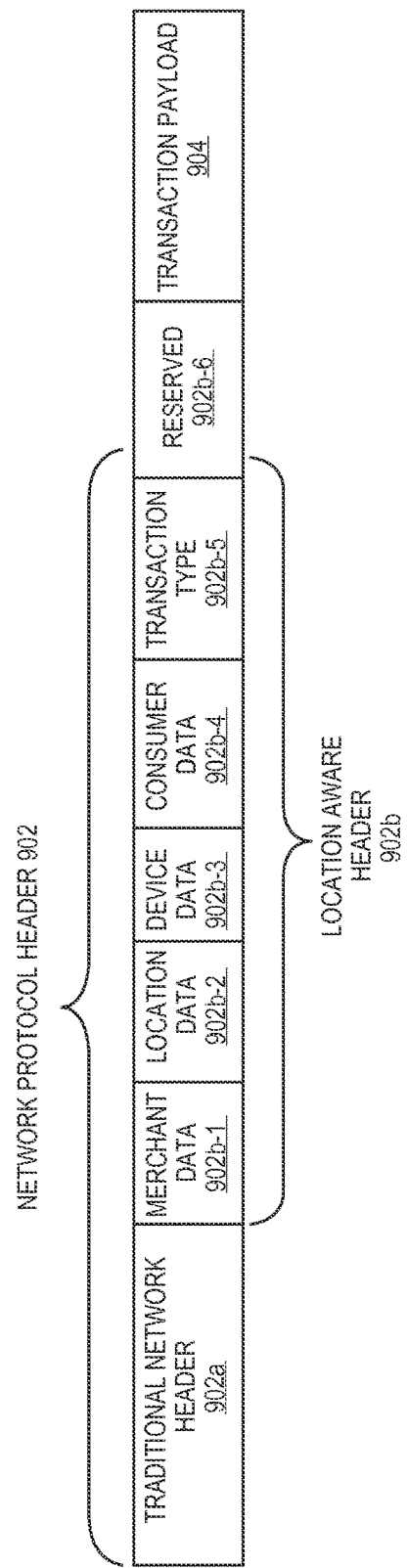
FIG. 9 shows a diagram of a network protocol packet according to an exemplary embodiment of the invention

The internet controller 620 may further include an authentication module 620a and a database 620b. In embodiments of the present invention, the authentication module 620a may be configured to authenticate the mobile device (602a and 602b). For example, if the mobile device 602a is in proximity to location terminal 616a, the location terminal 616a may retrieve data from the secure module (e.g., SIM card) of the mobile device 602a or from a software application operating on the mobile device providing information from other memory/storage on the mobile device. The location terminal may pass the received data in a location-aware header portion of a network protocol packet 900 (as shown in FIG. 9) to the location proxy module 618a. The location proxy module may send or forward the network protocol packet 900 including the location-aware header portion through a communications network (e.g., the Internet 624) to the internet controller 620.

In some embodiments, the authentication module may authenticate a subscriber identifier and/or device identifier received in the device data field 902b-3 in a location-aware header portion of a network protocol packet 900 using stored authentication values associated with the device and/or consumer operating the device. In some embodiments, the authentication module 620b may use a consumer identifier (e.g., email address, e-wallet account data, user login) received in a consumer data field 902b-4 in a location-aware header portion of a network protocol packet 900 to authenticate the device and/or consumer. If the mobile device is authenticated, the processes and functionality described herein may be completed. If the device or consumer is not authenticated, the functionality and processes may be stopped.

Figure 7:
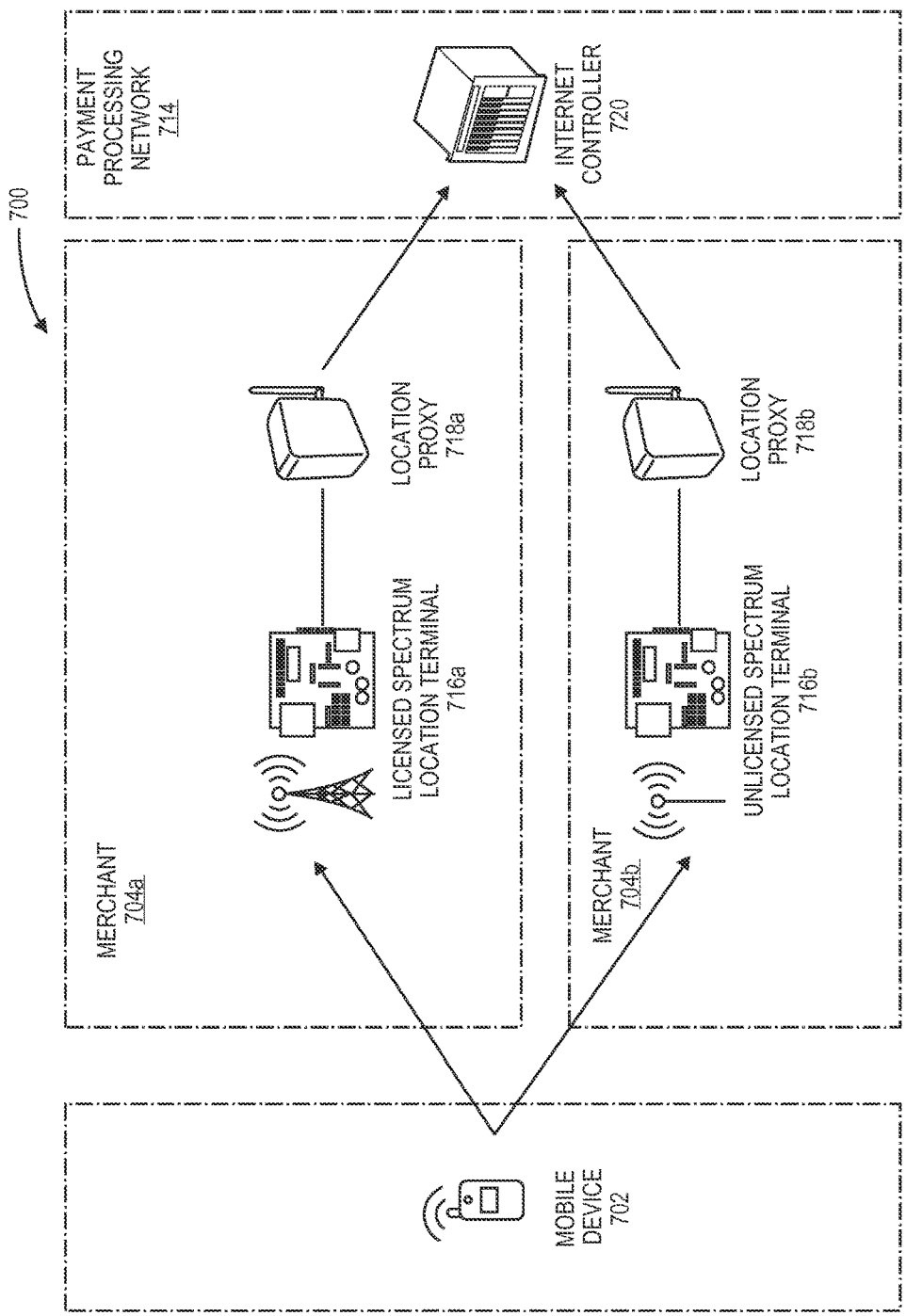
FIG. 7 shows a block diagram illustrating the multiple communication modes that a mobile device is configured to use in an exemplary location-aware transaction processing system according to an embodiment of the invention.

FIG. 7 shows a block diagram 700 illustrating the multiple communication modes that a mobile device is configured to use in an exemplary location-aware transaction processing system according to an embodiment of the invention. A mobile device 702 may be capable of operating as a dual mode handset (e.g., the mobile device 702 may be capable of sending and receiving data and information via a mobile network and via Wi-Fi. FIG. 7 illustrates that, in some embodiments of the present invention, the location terminals (716a and 716b) may be configured to support both licensed spectra (e.g., mobile network) and un-licensed spectra (e.g., Wi-Fi, Bluetooth®, Zigbee®, Dash7®, etc.) for a mobile device 702. The location terminals (716a and 716b) may access data stored on the mobile device 702 and transmit the data through the location proxy (718a and 718b) to an internet controller 720 in the payment processing network 715.

Devices using licensed spectrum may also be referred to as being on a centrally-controlled system. For example, a mobile device 702 operating on a mobile network is subscribed to a mobile network in order to access services. In embodiments of the present invention, when the mobile device 702 is accessed by the licensed spectrum location terminal 716a, the mobile identifier retrieved from the mobile device 702 may be data from a SIM card. Data in the SIM card may be sent to the internet controller 620, along with other device, merchant, consumer, and location data, and used to authenticate the mobile device 702. For example, an IMSI associated with the mobile device 702 may be authenticated by the authentication module 620a (as shown in FIG. 6).

Devices using unlicensed spectrum may also be referred to as being on a distributed network. Unlicensed spectrum is open for shared use by an unlimited number of users, and is typically used by Wi-Fi or Bluetooth® devices. In embodiments of the present invention, when the mobile device 702 is accessed by the unlicensed spectrum location terminal 716b, the mobile identifier retrieved from the mobile device 702 may be a consumer credential or login name.

The computing device 702 may comprise a specialized SIM card or other specialized memory that allows the computing device 702 to be identified and tied to an account, mobile wallet, or service provided by a payment processing network 708. The computing device 702 may comprise a chip (e.g., a SIM card or other secure module) that includes payment processing network identifier that may be read by the network equipment, bundled into a communication data message, and transmitted to the payment processing network 714. The payment processing network identifier may also allow the computing device 702 and the payment processing network 714 to communicate over an out-of-band signaling channel through the use of SS7 signaling protocols using embodiments described above in reference to FIGS. 2-4.

Figure 8:
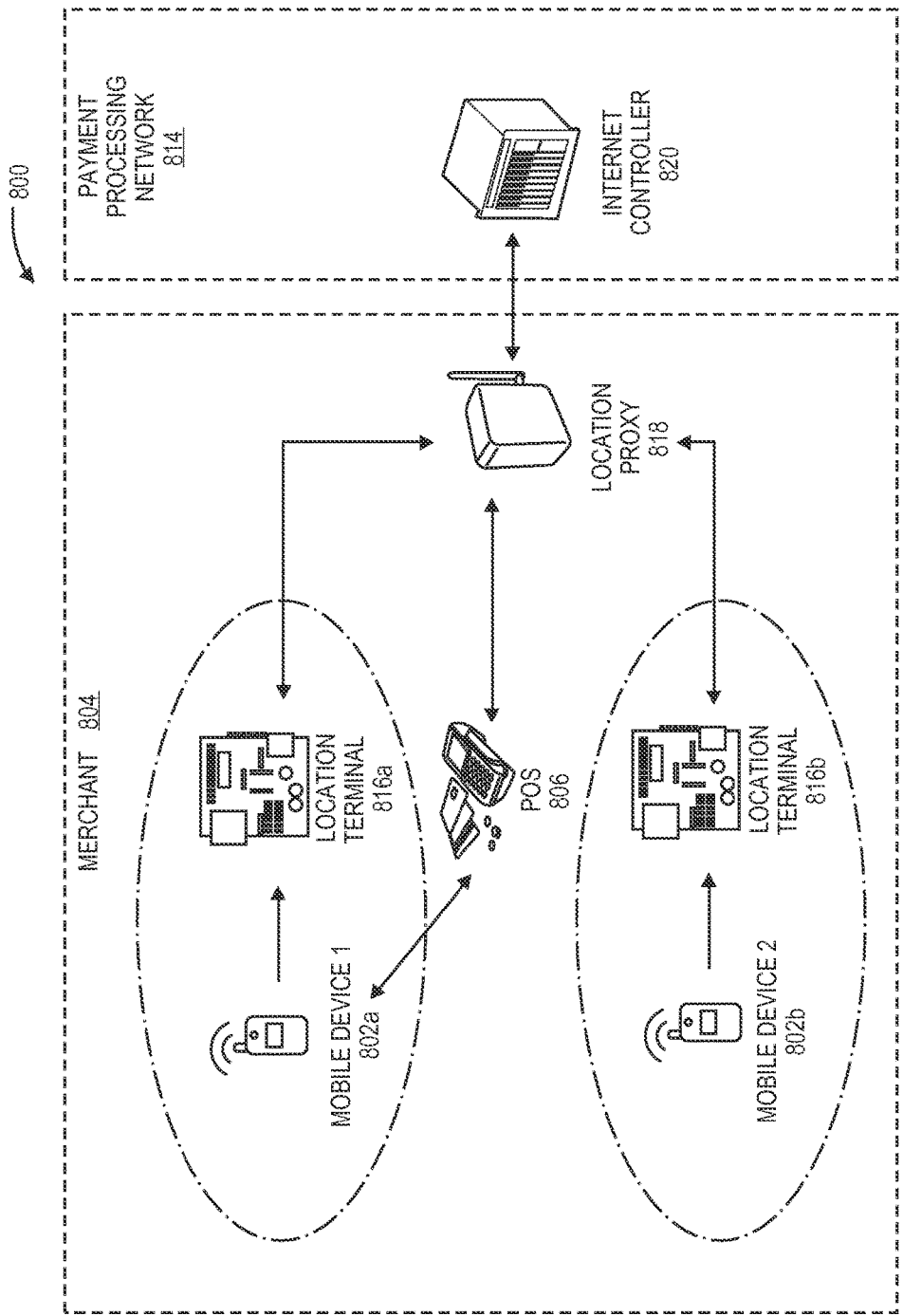
FIG. 8 shows a block diagram illustrating the interaction of multiple location-aware infrastructure devices and mobile devices in an exemplary location-aware transaction processing system according to an embodiment of the invention.

FIG. 8 shows a block diagram illustrating the interaction of multiple location-aware infrastructure devices and mobile devices in an exemplary location-aware transaction processing system according to an embodiment of the invention. FIG. 8 illustrates the collection of location data and transaction data at a merchant 804 using a plurality of location terminals (816a and 816b), a POS terminal 806, and a location proxy 818. Each location terminal (816a and 816b) may have a specific coverage area within a merchant location, as depicted by the elliptical shaped regions surrounding each location terminal (816a and 816b). Mobile devices located within the elliptical shaped regions may be accessed by the corresponding location terminal. For example, mobile device 1 802a is within the range of (or in proximity to) location terminal 816a, while mobile device 2 802b is within the range of (or in proximity to) location terminal 816b.

In some embodiments of the present invention, the location terminals (816a and 816b) may collect or be preconfigured with merchant data (e.g., merchant identifier, location identifier). The location terminals (816a and 816b) may also collect device data and consumer data from the mobile devices (802a and 802b) (e.g., device identifier, consumer identifier). The data retrieved by the location terminals (816a and 816b) may then be sent to the location proxy 818 in a network header to be combined into a network packet. In some embodiments, a merchant 804 may have a plurality of location terminals (816a and 816b) within the merchant location and a location proxy 818 that collects the data from the plurality of location terminals (816a and 816b).

In the example in FIG. 8, a transaction may be conducted between mobile device 1 802 using the POS terminal 806 at the merchant 804. The POS terminal 806 may retrieve additional information from mobile device 1 802, including but not limited to, hardware data from the mobile device 1 802, and transaction data including an issuer identifier and other payment device data (e.g., payment account number). The POS terminal 806 may send the retrieved data and a transaction type indicator with the transaction data to the location proxy 818. The data may be sent in a network packet 900 formatted as shown in FIG. 9. In embodiments of the present invention, the location proxy 818 may associate the data for mobile device 1 802 retrieved by the location terminal 806a with the data for mobile device 1 802 and the transaction data retrieved sent by the POS terminal 806. The data from the location terminal 816a and the data from the POS terminal 806 may be associated based on a device identifier or consumer identifier common to the data retrieved from the location terminal 816a and the POS terminal 806.

The data may then be packaged into a location-aware header and sent in a network protocol packet to the internet controller 820 located at the payment processing network 814. As noted previously, in some embodiments, the internet controller 820 may be a separate entity from the payment processing network 820.

FIG. 9 shows a diagram of a network protocol packet 900 according to an embodiment of the invention. The network protocol packet 900 may include a network protocol header (e.g., control) 902 and a transaction payload (e.g., data) 904. In embodiments of the present inventions, the network protocol header 902 may include a traditional network header 902a and a location-aware header 902b. The traditional network header 902a may include, for example, source and destination addresses (MAC and/or internet protocol addresses) and similar data used for routing the network protocol packet 900. According to the embodiments as shown, the location-aware header 902b is appended to the traditional network header 902a. In some embodiments, the location-aware header 902b can be prepended to the traditional network header 902a, or be inserted in between fields of the traditional network header 902a (e.g., in between source and destination addresses). In some embodiments, an existing field or fields of the traditional network header 902a can be repurposed for the location-aware header 902b. For example, the options field of an IP packet header can be used for the location-aware header 902b.

According to some embodiments, appending the location-aware header 902b to the traditional network header 902a, or repurposing an existing field or fields of the traditional network header 902a may allow the network protocol packet 900 to be used with existing network equipment. Existing network equipment that may not necessarily have location-aware header functionalities can still parse the beginning portions of the network protocol packet 900 to perform networking functions (e.g., to obtain source and destination addresses to route the packet). In embodiments in which the location-aware header 902b is prepended or inserted in the traditional network header 902a, the network equipment receiving the network protocol packet 900 can be updated to recognize the modified header format.

In embodiments of the present invention, the location-aware header 902b may include data retrieved by the location terminals (816a and 816b) and the POS terminal 806, as described in FIG. 8. The retrieved data may include one or more of mobile device data, consumer data, merchant data, location data, and transaction type data. In some embodiments, the network protocol packet may be an IP/TCP protocol packet. Merchant data including a merchant identifier and/or a merchant location may be stored in a merchant data portion 902b-1 of the location-aware header 902b. Location data including a location identifier may be stored in a location data portion 902b-2 of the location-aware header 902b. Device data including a hardware identifier (e.g., MAC address) may be stored in a device data portion 902b-3 of the location-aware header 902b. Consumer data including a consumer identifier (e.g., e-wallet account, email address) may be stored in a consumer data portion 902b-4 of the location-aware header 902b. Transaction type data indicating whether the transaction is a non-financial transaction (e.g., coupon request or account information request) or a financial transaction (e.g., purchase transaction) may be stored in a transaction type portion 902b-5 of the location-aware header 902b. The location-aware header 902b may further include a reserved field 902b-6 for additional data that may be relevant to verifying or validating a transaction, targeting a consumer, or any other purposes of embodiments of the present invention. Other embodiments of the present invention may include all of the fields described above, fewer fields, or additional fields, as one of ordinary skill in the art would recognize.

The transaction payload portion 904 of the network protocol packet 900 may contain the transaction data for a transaction conducted using the mobile device 802a that is sent from the POS terminal 806 as part of the authorization process for the transaction. In some embodiments of the present invention, the transaction data in the transaction payload portion 904 may be in an ISO 8583 message. ISO 8583 specifies a common message interface that allows financial data messages for a transaction to be interchanged between acquirers, issuers, and payment processing networks.

In other embodiments, the data in the transaction payload portion 904 may be in any suitable format and may include non-financial transaction data. For example, the transaction payload portion 904 may include non-financial transaction data including data for alert or notification generation, product information. The transaction payload may be data being sent between devices, including mobile devices, televisions, point of sale devices, automobiles.

As depicted in FIG. 9, the location-aware header 902 in the network protocol packet 900 is located following the traditional network header 902a. In such embodiments, as the location of the traditional network header 902a is not modified, network devices can process the network protocol header 902a without additional software or configuration data or changes to the network infrastructure. In alternative embodiments, the location-aware header 902 may be placed preceding the traditional network header 902a. In such embodiments, in order to process the network protocol header 900, network devices may require updated software or configuration data enabling the network devices to recognize the format of the network protocol packet 900.

Figure 10:
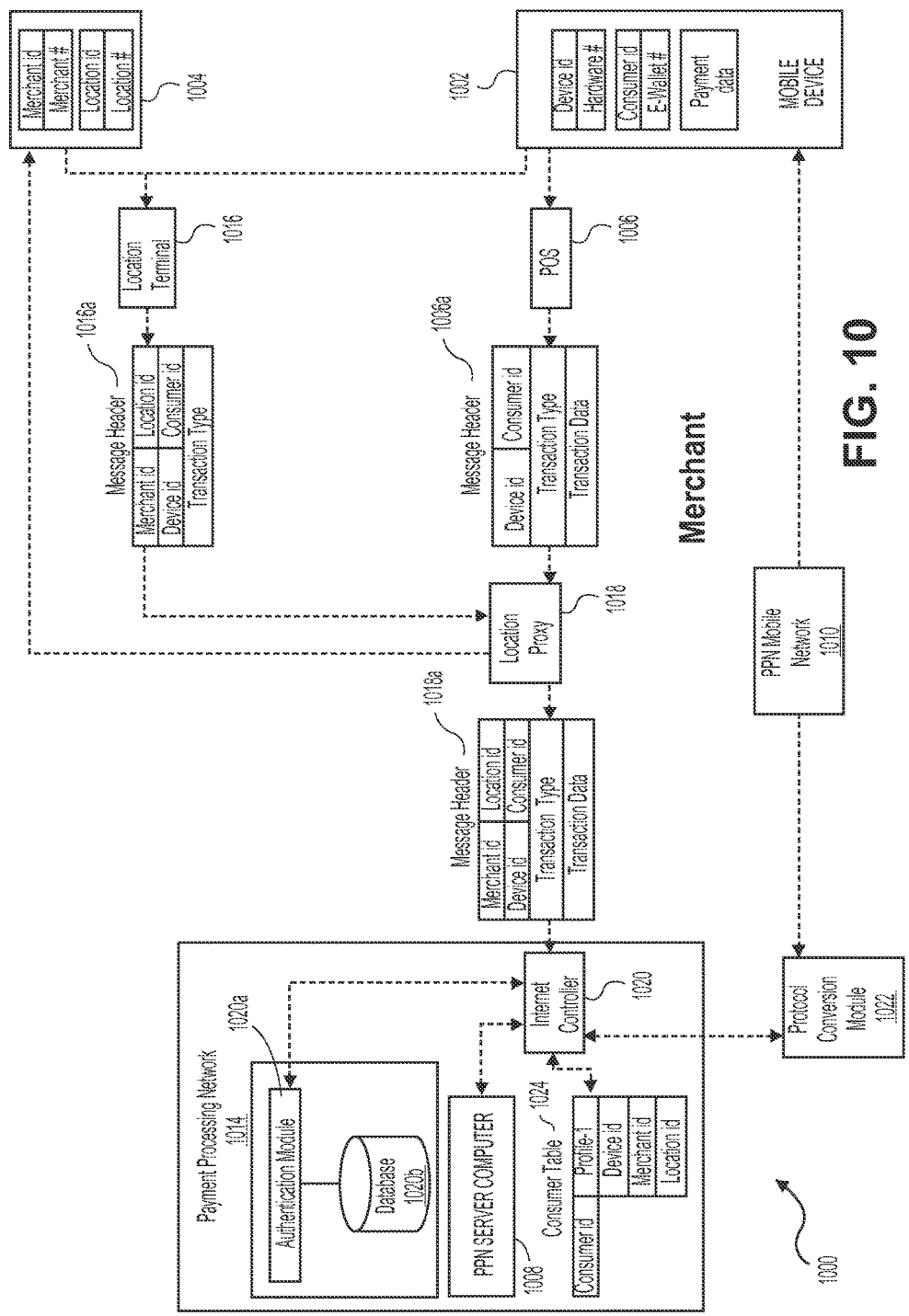
FIG. 10 shows a detailed diagram of the data flow using an exemplary location-aware infrastructure according to an embodiment of the invention.

FIG. 10 shows a detailed diagram 1000 of the data flow using the location-aware infrastructure according to an embodiment of the invention. FIG. 10 shows the data that may be included in the location-aware header portion of the network packet depicted in FIG. 9. The diagram 1000 includes a mobile device 1002, a POS terminal 1006, a PPN mobile network 1010, a payment processing network 1014, a location terminal 1016, a location proxy 1018, an internet controller 1020, and a protocol conversion module 1022.

The payment processing network 1014 may further include a PPN server computer 1008 to facilitate transaction processing. The internet controller 1020 may be a module within the payment processing network 1020 and may be operably connected to an authentication module 1020a and a database 1020b. The database 1020b may comprise consumer tables 1024 comprising previous data received within the location-aware header as well as registration and account information associated with the consumer. The internet controller 1020 may access the consumer tables 1024 stored in the database 1020b. As shown in FIG. 10, the consumer table 1024 may be organized by consumer identifier. In some embodiments, each consumer identifier may have a separate consumer table 1024. In the example shown in FIG. 10, the consumer identifier is associated with a profile number, a device identifier, a merchant identifier, and a location identifier. The data stored in the consumer table 1024 may be used for authentication by the authentication module 1020a, as well as by the internet controller 1020 for validating transactions.

The internet controller 1020 may validate a transaction by associating the data extracted from the location-aware header for the transaction with a consumer record in the consumer table 1024 using the consumer identifier and/or device identifier. The consumer record 1024 may include prior location-aware data retrieved from the mobile device 1002 and the internet controller may use the relevant prior location-aware data to validate and/or authenticate a transaction. The internet controller may compare the location-aware data associated with the current transaction to the location-aware data stored in the consumer table in order to obtain additional information about the consumer, the transaction, and their authenticity. This process may be achieved through any suitable analysis, as one of ordinary skill in the art would understand. Additional details and examples are described below with respect to FIGS. 11 and 12.

C. Methods

Methods according to embodiments of the invention can be described with respect to FIGS. 5-10.

Figure 11:
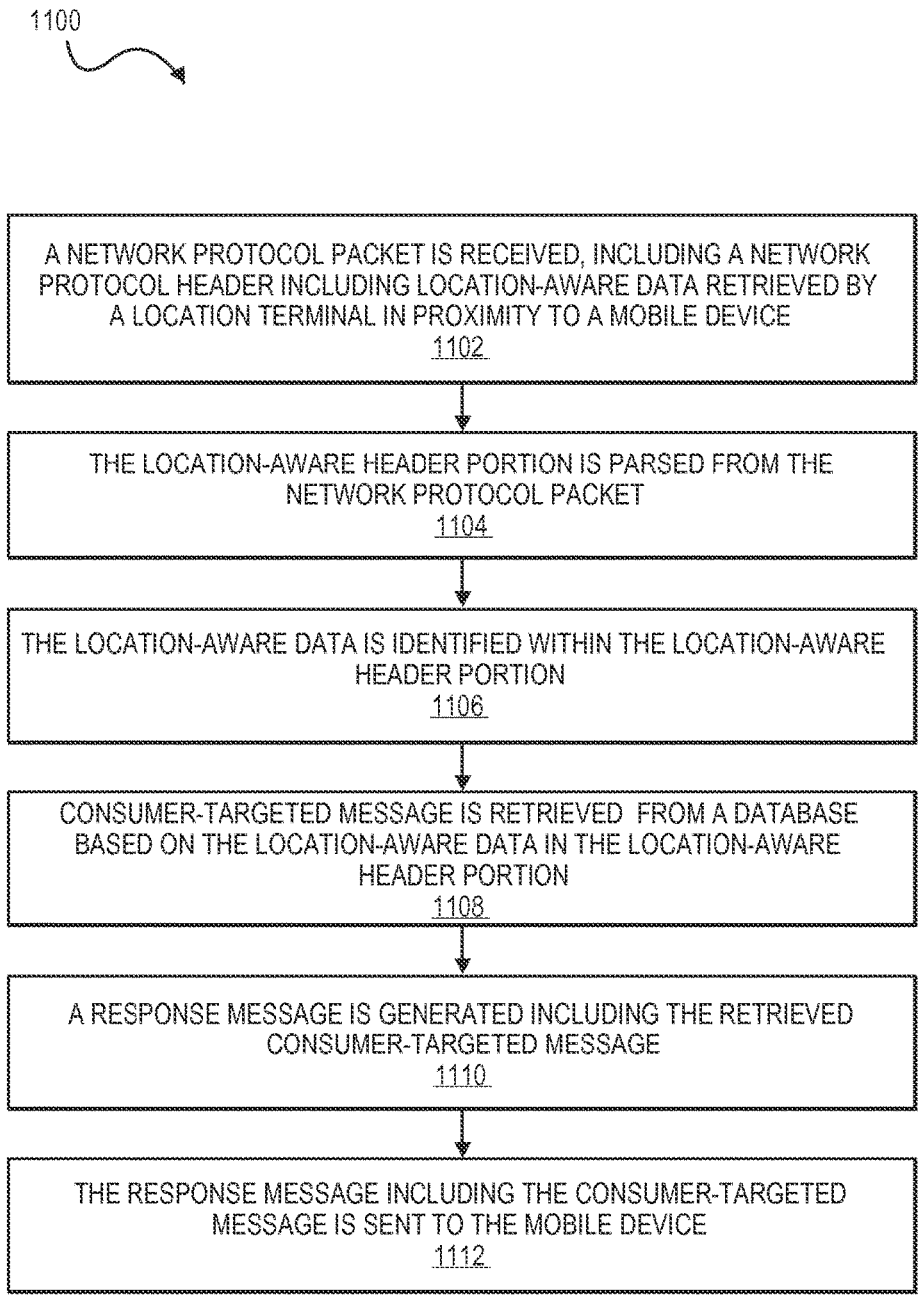
FIG. 11 is a flowchart describing an exemplary method of using a location-aware infrastructure to track a consumer and issue a consumer-targeted message to a consumer according to an embodiment of the invention.

FIG. 11 is a flowchart describing processing for a network protocol packet for a non-financial transaction through a system 1000 according to an embodiment of the invention. The embodiment described in FIG. 11 relates to the issuance of consumer-targeted messages, including, but not limited to, notification messages, coupons, and alert messages.

In step 1102, a network protocol packet is received, including a network protocol header including location-aware data retrieved by a location terminal in proximity to a mobile device. In embodiments of the present invention, the internet controller 1020 in the payment process network 1014 may receive the network protocol packet 1018a. The network protocol packet 1018a may include a merchant identifier, a location identifier, a device identifier, the consumer identifier, and a transaction type identifier. In some embodiments of the present invention, a transaction data portion may also be included in the network protocol packet 1018a. For non-financial transactions, the transaction data portion may not contain any data or may include a flag for indicating that the transaction is a non-financial transaction.

In some embodiments of the present invention, a location terminal 1016 may access data on a mobile device 1002 to retrieve data for the network protocol packet 1018a. The location terminal 1016 may retrieve data from the mobile device 1002 when the mobile device 1002 moves into proximity to the location terminal 1016. The location terminal 1016 may retrieve the merchant identifier, device identifier, location identifier, and consumer identifier from the mobile device 1002. Further, the location terminal may provide a transaction type identifier indicating that the transaction is a non-financial transaction.

The merchant identifier may be a previously assigned identification number for a merchant. In some embodiments, the merchant identifier may be a numeric or alphanumeric value. The location identifier may correspond to a physical address or some other geographic location. In one embodiment, the location identifier may correspond to an address of the merchant location or to a specific area or product group within the merchant location. The device identifier may correspond to an identifier of the mobile device 1002. In one embodiment, the device identifier may correspond to data stored on a subscriber identity module (SIM) of the mobile device 1002. The consumer identifier may correspond to an identifier of the consumer associated with the mobile device 1002. In one embodiment, the consumer identifier may be a digital wallet number, an email address or other consumer data. The merchant identifier, location identifier, device data, and consumer data may be stored in a database 1020b associated with the payment processing network 1014.

The network protocol packet 1016a generated by the data retrieved by the location terminal may then be sent to a location proxy 1016. In some embodiments, the location proxy 1018 may determine whether a POS terminal 1006 conducted a transaction with the mobile device 1002. The location proxy 1018 may then send the network protocol packet 1018a to the internet controller 1020. In some embodiments, the network protocol packet 1018a may be sent across a communications network (e.g., the Internet).

As an example, a consumer with mobile device 1 802a may be moving through a merchant 804 (as shown in FIG.

8). As the mobile device 1 802a moves in the coverage area of location terminal 816a, the location terminal 816a may retrieve data from the mobile device 1 802a. The mobile device may periodically transmit mobile communication messages (sometimes called a "ping") that identifies the mobile device identifier and the subscriber identifier to any wireless receives within its transmission range. The location terminal 816 may be configured to receive the periodic mobile communication messages and identify the mobile device identifier and the consumer identifier from the message.

The location terminal may have a pre-configured or pre-determined merchant data including a merchant identifier identifying the specific merchant associated with the location terminal. In some embodiments, the location terminal may obtain this information from a similar mobile communication message from a local merchant device (e.g. POS). For example, the merchant identifier may be numeric value, e.g., 11234, which may indicate merchant identifier 11234 which may be associated at the internet controller 1020 with merchant "Big Box."

Location data may indicate a specific location associated with the merchant (e.g., "Big Box") 804 and may include a particular store address as well as in some embodiments, the particular aisle, location, or product group of one of many location terminals within the merchant. The location data (e.g., 005) may be associated with a specific address (e.g., 9000 Main Street, San Francisco, Calif.) of the merchant identifier (e.g., 11234) associated with the location data (e.g., 005) at the internet controller 1020. Alternatively, the location data may be associated with a particular area, product grouping, or other geographic region within a store to indicate a specific location terminal within the merchant (e.g., 005-01, indicating location terminal 01 within the store associated with location 005 of the merchant 11234). All of the relevant information associated with the identifiers may be stored at the database of the internet controller 1020 to allow the internet controller 1020 to identify and associate received data with a particular merchant, store, location, product grouping, etc. For example, location data 005-01 may indicate the location terminal associated with the "produce aisle" at store location 005 of "Big Box" merchant.

The device data may include a device identifier for mobile device 1 802a The device identifier may be a phone number (e.g., 415-555-1234) associated with mobile device 1 802a, or may be an international mobile subscriber identity (e.g., 310155123456789, where the first three digits ("310") represent the mobile country code, the second three digits ("155") represent the mobile network code, and the remaining digits ("123456789") represent the mobile subscription identifier number within the mobile network's subscriber base. Any other suitable device identifiers may also be used.

The consumer data may include a consumer identifier that may represent identification data related to the consumer. For example, the consumer identifier may be an email address (e.g., janedoe@server.com), user name, social security number, personal data of the consumer (e.g., name, address, birthdate, etc.), or any other unique user information.

The transaction type data may be used to indicate the type of transaction associated with the location-aware header. For example, the transaction type data may be an alphanumeric or numeric value indicating whether the transaction is a payment transaction (e.g., purchase of goods or services) or a non-payment transaction (e.g., coupon request or account balance request). For instance, a payment transaction may include the transaction type identifier of 0001, a location tracking transaction may include a transaction type identifier of 0002, and a consumer authentication for access to a secure area may include a transaction type identifier of 0003. Any additional payment and non-payment transaction types may be implemented as one of ordinary skill would recognize.

In step 1104, the location-aware header portion is parsed from the network protocol packet. In embodiments of the present invention, the internet controller 1020 may receive the network protocol packet 1018a and parse out the location-aware header (902b as depicted in FIG. 9). The location-aware header portion may include at least one of merchant data, location data, device data, consumer data, and transaction type data.

In some embodiments, after identifying the location-aware data from the location-aware header portion, the internet controller 1020 may perform an authentication process. The internet controller 1020 may utilize an authentication module 1020a to authenticate the mobile device 1002. In some embodiments, the authentication module may authenticate an IMSI (e.g., 310150123456789, in the example above) retrieved from the subscriber identity module (SIM) received in a device data field 902b-3 in a location-aware header portion of a network protocol packet 900.

The authentication module 1020a may authenticate the mobile device 1002 using the received device identifier (e.g., IMSI 310150123456789). The authentication module 1020a may retrieve a consumer record or entry corresponding to the consumer identifier received in the location-aware header. The consumer record may be retrieved from the database 1020b. The authentication module 1020a may then determine whether the device identifier associated with the mobile device 1002 is included in the list of device identifiers previously associated with the consumer identifier. The list of device identifiers may include all device identifiers associated with the consumer identifier that the internet controller 1020 has received with transactions using the location-aware header.

For example, the authentication module 1020a may locate the consumer record or entry associated with consumer identifier, "janedoe@server.com." The authentication module 1020a may locate the device identifiers portion of the consumer record and determine whether IMSI "310150123456789" is included. If the received device identifier is present in the consumer record, the authentication module 1020a may determine that the mobile device 1002 may be authenticated and the transaction may proceed. If the received device identifier is not in the consumer record, the authentication module 1020a may determine that the mobile device 1002 cannot be authenticated.

In step 1106, the location-aware data is identified within the location-aware header portion. In embodiments of the present invention, the internet controller 1020 may extract the data from the location-aware header portion. The internet controller 1020 may associate the data extracted from the location-aware header into corresponding portions of a consumer table 1024. The consumer table 1024 may include prior location-aware data retrieved from the mobile device 1002 and associate it with the consumer.

In step 1108, a consumer-targeted message is retrieved from a database based on the location-aware data in the location-aware header portion. In embodiments of the present invention, the internet controller 1020 may use data from the location-aware header portion to obtain the location-based consumer-targeted message (e.g., coupons, advertisements, deals or other promotional offers) for the user associated with the mobile device 1002. The internet controller 1020 may access a database 1020b containing the consumer-targeted message. In other embodiments, the internet controller 1020 may retrieve the consumer-targeted message from a third party.

In embodiments of the invention, the internet controller 1020 may use the merchant identifier and the location identifier to retrieve a consumer-targeted message for the merchant or for a specific product sold by the merchant.

For example, the consumer-targeted message in the form of an incentive may be merchant-based (20% off total purchases at the merchant 804), or may be product-based based on the location of mobile device 1 802a (e.g., $5 off vacuum when mobile device 1 802a is located in proximity to a location terminal 816a in a household section of the merchant 804).

In step 1110, a response message is generated including the retrieved consumer-targeted message. The internet controller 1020 may then generate a response message including the retrieved consumer-targeted message. In embodiments of the present invention, the response message may be generated in an internet protocol. In other embodiments, the response message may be generated in any suitable communications protocol.

In step 1112, the response message including the consumer-targeted message is sent to the mobile device. In some embodiments, where the response message is generated in the internet protocol, the internet controller 1020 may send the response message across a communications network, such as the Internet, to the mobile device 1002.

In alternative embodiments, the response message may be sent to the protocol conversion module 1022. The protocol conversion module 1022 may encapsulate the response message into a mobile network protocol (e.g., SS7 or a comparable signaling protocol), as described previously with respect to FIGS. 2-4. The encapsulated response message may then be sent to the mobile device 1002 through the PPN mobile network 1010. The encapsulated response message may be then be displayed on the mobile device 1002.

Figure 12:
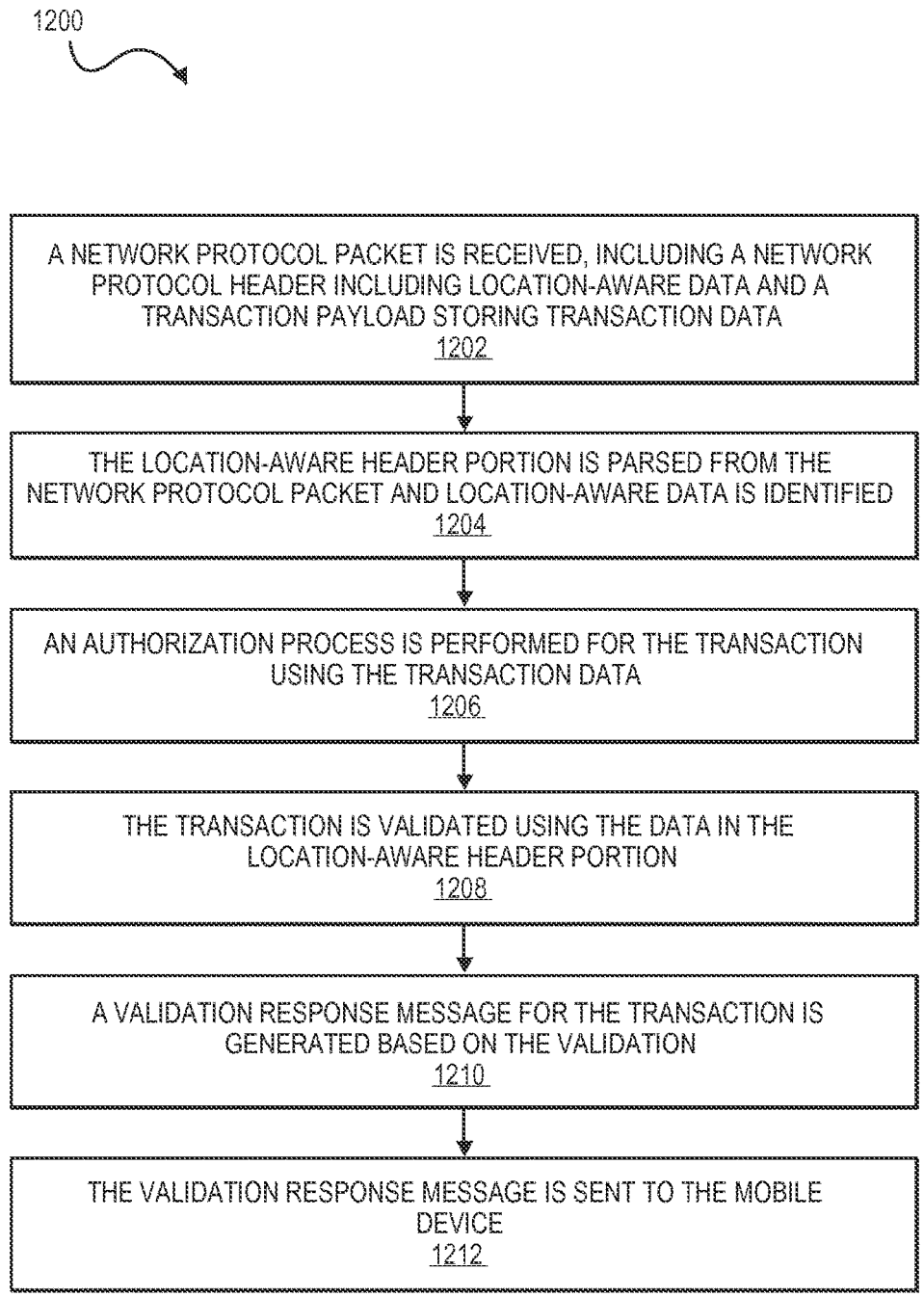
FIG. 12 is a flowchart describing an exemplary method of using a location-aware infrastructure to validate a transaction according to an embodiment of the invention.

FIG. 12 is a flowchart describing processing for a network protocol packet for a financial transaction through a system 1000 according to an embodiment of the invention In step 1202, a network protocol packet is received, including a network protocol header including location-aware data and a transaction payload storing transaction data. In embodiments of the present invention, the internet controller 1020 in the payment process network 1014 may receive the network protocol packet 1018a. The network protocol packet 1018a may include a merchant identifier, a location identifier, a device identifier, the consumer identifier, and a transaction type identifier. In some embodiments of the present invention, transaction data may also be included in the network protocol packet 1018a in a transaction payload portion (904 as shown in FIG. 9).

For example, in addition to the data described with respect to FIG. 11, the network protocol packet 900 may include a transaction payload with transaction data for the financial transaction. The transaction data in the transaction payload portion may include payment data (e.g., payment account number, consumer address) from the mobile device 1002, transaction amount (e.g., $100), merchant identifier (merchant number 11234), and other data required for processing financial transactions. This data may be used for authorization processes performed by the payment processing network server computer 1008.

In step 1204, the location-aware header portion is parsed from the network protocol packet and location-aware data is identified. In embodiments of the present invention, the internet controller 1020 may receive the network protocol packet 1018a and parse out the location-aware header (902b as depicted in FIG. 9). The location-aware header portion 902b may contain at least one of merchant data, device data, consumer data, and transaction type data.

In embodiments of the present invention, the internet controller 1020 may extract the data from the location-aware header portion. The internet controller may associate the data extracted from the location-aware header into corresponding portions of a consumer table 1024. The consumer table 1024 may include prior location-aware data retrieved from the mobile device 1002 and associate it with the consumer.

In some embodiments, after identifying the location-aware data from the location-aware header portion, the internet controller 1020 may perform an authentication process. The internet controller 1020 may utilize an authentication module 1020a to authenticate the mobile device 1002. In some embodiments, the authentication module may authenticate an IMSI (e.g., 310150123456789, in the example above) retrieved from the subscriber identity module (SIM) received in a device data field 902b-3 in a location-aware header portion of a network protocol packet 900. The authentication process may be conducted as described above with respect to FIG.

In step 1206, an authorization process is performed for the transaction using the transaction data. In embodiments of the present invention, the transaction data sent by the POS terminal 1006 may be parsed from the transaction payload portion 904 of the network protocol packet 900. The internet controller 1020 may send the transaction data to the PPN server computer 1008. As described previously, the PPN server computer 1008 may be configured to perform authorization and clearing and settlement services related to financial transactions.

In embodiments of the present invention, the authorization process may include sending an authorization request message from PPN server computer 1008 to an issuer computer, and receiving an authorization response message indicating a response to the authorization request message (e.g., indicating whether the transaction has been authorized or rejected).

In step 1208, the transaction is validated using the data in the location-aware header portion. In embodiments of the present invention, the location-aware data in the location-aware header portion 902b may be used to further validate the transaction. The validation process may include identifying a consumer profile in a database associated with the consumer data from the location-aware header portion 902b. The consumer profile may be located in the consumer tables 1024. In embodiments of the present invention, the validation process may also include comparing data stored in the consumer profile with the location-aware data from the location-aware header portion 902b, wherein the transaction is validated when the data stored in the consumer profile match the location-aware data from the location-aware header portion 902b.

In such embodiments, the location-aware data may provide improved fraud detection. For example, the internet controller 1020 may analyze the authorization response message and compare the transaction data with data stored in the consumer profile in the consumer tables 1024. In some embodiments, based on the merchant identifier, location identifier, and device identifier associated with a consumer identifier, a potentially fraudulent transaction may be detected.

For example, the internet controller 1020b may determine from the consumer tables 1024 that the device identifier associated with the mobile device 1002 made a first purchase at a merchant in San Francisco, Calif. and a second purchase an hour later at a merchant in New York City. The internet controller 1020 may use this data to determine that the current transaction is fraudulent or suspect as two transactions using the same device identifier would likely not be conducted at the two different merchants within a short span of time. In another example, a transaction may not be legitimate if the device identifier is not associated with the consumer identifier of record (e.g., the device identifier for the transaction is not found in the entry for the consumer identifier stored in the consumer tables 1024).

In another example, internet controller 1020b may use the device identifier to verify the consumer. The internet controller 1020b may evaluate a consumer identifier (e.g. janedoe@server.com), and a device identifier (e.g., 415-555-1234) received in the location aware header. The internet controller 1020b may access the consumer table 1024 using the consumer identifier. If the consumer account of the consumer has been compromised and is being used on a different mobile device 1002, the profile in the consumer table 1024 associated with the consumer identifier ("janedoe@server.com") may not have the device identifier for the mobile device 1002 conducting the transaction. This may be an indication that the transaction in the transaction payload 904 is being conducted using consumer account data on a mobile device 1002 not associated with the consumer, which may be indicative of potential fraud.

In embodiments of the present invention, if the transaction is determined to be fraudulent based on the validation against the consumer table 1024 in the database, the internet controller 1020 may decline to validate the consumer or the mobile device 1002. In such cases, the internet controller 1020 may reject the transaction and notify the user via the mobile device 1002 and the merchant of the rejection.

In step 1210, a validation response message for the transaction is generated based on the validation. Based on the validation performed by the internet controller 1020, a validation response message may be generated. In some embodiments, if the transaction was validated, the validation response message may include the authorization response message from the issuer authorizing the transaction. In such embodiments, when the transaction is not or cannot be validated by the internet controller 1020, the validation response message may include an indicator that the transaction could not be validated. The internet controller 1020 may send the validation response message to the mobile device 1002 and a merchant associated with the transaction.

In step 1212, the validation response message is sent to the mobile device. In some embodiments, where the validation response message is generated in the internet protocol, the internet controller 1020 may send the validation response message across a communications network, such as the Internet to the mobile device 1002. In embodiments of the present invention, the internet controller 1020 may send the validation response message to the mobile device 1002 and a merchant associated with the transaction.

In alternative embodiments, the validation response message may be sent to the protocol conversion module 1022. The protocol conversion module 1022 may encapsulate the validation response message into a mobile network protocol (e.g., SS7 or a comparable signaling protocol), as described previously with respect to FIGS. 2-4. The encapsulated validation response message may then be sent to the mobile device 1002 through the PPN mobile network 1010. The encapsulated response message may be then be displayed on the mobile device 1002.

III. Exemplary Apparatuses

Figure 13:
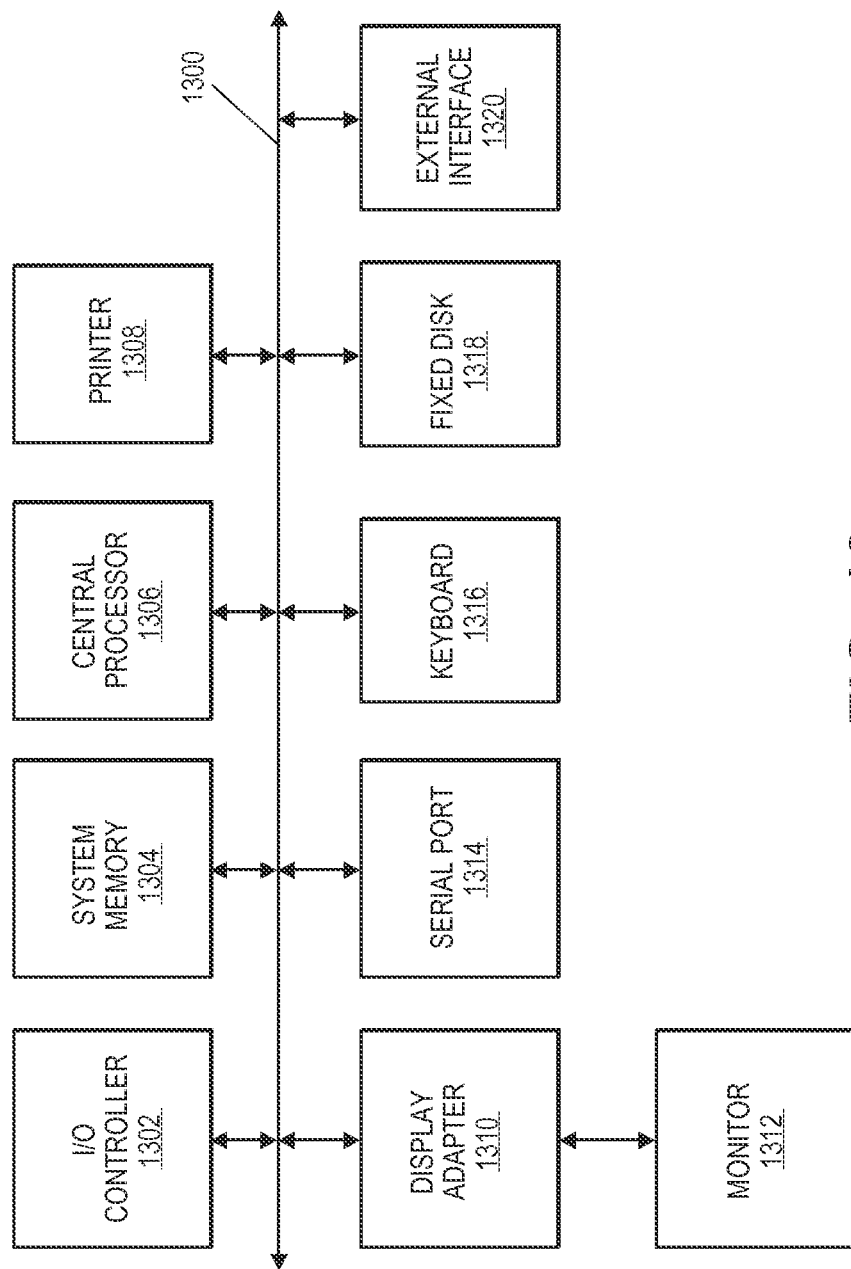
FIG. 13 shows a block diagram of a computer apparatus according to an embodiment of the invention.

The various participants and elements may operate one or more computer apparatuses (e.g., a server computer) to facilitate the functions described herein. Any of the elements in the figures may use any suitable number of subsystems to facilitate the functions described herein. Examples of such subsystems or components are shown in FIG. 13. The subsystems shown in FIG. 13 are interconnected via a system bus 1300. Additional subsystems such as a printer 1308, keyboard 1316, fixed disk 1318 (or other memory comprising computer readable media), monitor 1312, which is coupled to display adapter 1310, and others are shown. Peripherals and input/output (I/O) devices, which couple to I/O controller 1302, can be connected to the computer system by any number of means known in the art, such as serial port 1314. For example, serial port 1314 or external interface 1320 can be used to connect the computer apparatus to a wide area network such as the Internet, a mouse input device, or a scanner. The interconnection via system bus 1300 allows the central processor 1306 to communicate with each subsystem and to control the execution of instructions from system memory 1304 or the fixed disk 1318, as well as the exchange of information between subsystems. The system memory 1304 and/or the fixed disk 1318 may embody a computer readable medium.

Further, while the present invention has been described using a particular combination of hardware and software in the form of control logic and programming code and instructions, it should be recognized that other combinations of hardware and software are also within the scope of the present invention. The present invention may be implemented only in hardware, or only in software, or using combinations thereof.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited in this patent are hereby incorporated by reference for all purposes.

One or more features from any embodiment may be combined with one or more features of any other embodiment without departing from the scope of the disclosure.

In some embodiments, any of the entities described herein may be embodied by a computer that performs any or all of the functions and steps disclosed.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

All patents, patent applications, publications, and descriptions mentioned above are herein incorporated by reference in their entirety for all purposes. None is admitted to be prior art.

What is claimed is:

1. A method comprising:
   receiving, by a mobile switching center associated with a first mobile network of a plurality of mobile networks, a transaction request message from a computing device communicating with a second mobile network of the plurality of mobile networks, the transaction request message received via a switch configured to connect the plurality of mobile networks, wherein the second mobile network is remote from the first mobile network and local to the computing device, wherein the first mobile network is a payment processing network mobile network configured to process mobile network operations and payment processing for the plurality of mobile networks;
   converting, by a protocol conversion module of the mobile switching center associated with the first mobile network, the transaction request message from a first protocol to a second protocol, wherein the protocol conversion module of the mobile switching center associated with the first mobile network that converts the transaction request message from the first protocol to the second protocol is central to the plurality of mobile networks and provides data protocol conversion for each of the mobile networks of the plurality of mobile networks;
   sending, by the protocol conversion module, the converted transaction request message to a payment processing server associated with the first mobile network, wherein the payment processing server processes a transaction associated with the converted transaction request message;
   receiving, by the protocol conversion module, a transaction response message from the payment processing server;
   converting, by the protocol conversion module, the transaction response message from the second protocol to the first protocol; and
   sending, by the protocol conversion module, the converted transaction response message to the computing device via the switch.

2. The method of claim 1 wherein the protocol conversion module is not located in a base station of the second mobile network.

3. The method of claim 1 wherein before sending the converted transaction response message, the method further comprises:
   identifying a recipient base station in the second mobile network communicating with the computing device.

4. The method of claim 1 wherein the mobile switching center is a payment processing network mobile switching center.

5. The method of claim 3 wherein identifying the recipient base station in the second mobile network communicating with the computing device further comprises:
   querying a home location register to obtain routing data for the computing device,
   wherein the routing data includes an identifier for a visitor location register currently associated with the computing device;
   receiving an international mobile subscriber identifier for the computing device from the second mobile network associated with the identified visitor location register;
   sending the international mobile subscriber identifier to the second mobile network; and
   receiving a mobile station roaming number for communicating with the computing device in the second mobile network.

6. The method of claim 5 wherein the home location register is periodically updated with identifying data for the second mobile network via a location message from the second mobile network when the computing device is within a coverage area of the second mobile network.

7. The method of claim 1 wherein converting the transaction request message from the first protocol to the second protocol further comprises:
   using a transmission protocol to identify an internet protocol message encapsulated within an SS7 protocol message.

8. The method of claim 7 wherein the transmission protocol is a stream control transmission protocol.

9. The method according to claim 1, wherein the protocol conversion module is configured to convert transaction request messages for a plurality of different mobile networks.

10. The method according to claim 1, wherein the switch is associated with the first protocol.

11. The method according to claim 1, wherein the switch is a public switched telephone network.

12. The method according to claim 1, wherein the mobile switching center is central to the plurality of mobile networks.

13. The method according to claim 1, wherein the second mobile network does not include the protocol conversion module.

14. The method according to claim 1, wherein the protocol conversion module converts the transaction response message in accordance with a payment communication protocol.

15. The method according to claim 1, wherein the computing device comprises a subscriber identifier, and wherein one of a notification, an alert, a coupon, and a reward is configured to be sent to the computing device in accordance with the subscriber identifier.

16. The method according to claim 1, wherein the transaction request message comprises a recipient identifier identifying a destination of the transaction request message.

17. A computer comprising:
    a processor; and
    a computer readable medium coupled to the processor, the computer readable medium comprising code, executable by the processor for implementing a method comprising:

receiving, by a mobile switching center, a transaction request message from a computing device communicating with a second mobile network of a plurality of mobile networks, the transaction request message received via a switch configured to connect the plurality of mobile networks, wherein the second mobile network is remote from a first mobile network of the plurality of mobile networks and local to the computing device, wherein the first mobile network is a payment processing network mobile network configured to process mobile network operations and payment processing for the plurality of mobile networks;

converting, by a protocol conversion module of the mobile switching center associated with the first mobile network, the transaction request message from a first protocol to a second protocol, wherein the protocol conversion module of the mobile switching center associated with the first mobile network that converts the transaction request message from the first protocol to the second protocol is central to the plurality of mobile networks and provides data protocol conversion for each of the mobile networks of the plurality of mobile networks;

sending, by the protocol conversion module, the converted transaction request message to a payment processing server associated with the first mobile network, wherein the payment processing server processes a transaction associated with the converted transaction request message;

receiving, by the protocol conversion module, a transaction response message from the payment processing server;

converting, by the protocol conversion module, the transaction response message from the second protocol to the first protocol; and sending, by the protocol conversion module, the converted transaction response message to the computing device via the switch.

18. A system comprising:

the computer of claim 17;

the switch configured to communicatively couple a first mobile network including the computer with a second mobile network; and a base station in the second mobile network in communication with the computing device, the base station configured to:

send the transaction request message to the first mobile network via the switch; and receive the transaction response message.

* * * * *

UNITED STATES PATENT AND TRADEMARK OFFICE
CERTIFICATE OF CORRECTION

PATENT NO. : 10,311,426 B2
APPLICATION NO. : 14/173718
DATED : June 4, 2019
INVENTOR(S) : Quan Wang and Steven Countway Page 1 of 1

It is certified that error appears in the above-identified patent and that said Letters Patent is hereby corrected as shown below:

In the Claims

Claim 18, Column 50, Line 16, please remove "communicatively couple a first" and insert
-- communicatively couple the first --

Claim 18, Column 50, Line 17, please remove "computer with a second" and insert
-- computer with the second --

Signed and Sealed this
Eighth Day of October, 2019

Andrei Iancu
*Director of the United States Patent and Trademark Office*